US011612282B2

(12) United States Patent
Dorra

(10) Patent No.: US 11,612,282 B2
(45) Date of Patent: *Mar. 28, 2023

(54) TOILET SEAT COVER ASSEMBLY FOR AUTOMATIC CLEANING

(71) Applicant: AUTO CLEANING TOILET SEAT L.L.C, Sunny Isles Beach, FL (US)

(72) Inventor: Maximo Dorra, Sunny Isles Beach, FL (US)

(73) Assignee: AUTO CLEANING TOILET SEAT L.L.C, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,402

(22) Filed: Jun. 30, 2022

(65) Prior Publication Data

US 2022/0330765 A1 Oct. 20, 2022

Related U.S. Application Data

(63) Continuation-in-part of application No. 16/929,849, filed on Jul. 15, 2020, now Pat. No. 11,377,832.

(51) Int. Cl.
*A47K 13/30* (2006.01)

(52) U.S. Cl.
CPC .......... *A47K 13/302* (2013.01); *A47K 13/307* (2013.01)

(58) Field of Classification Search
CPC .......... A47K 13/30–302; A47K 13/307; E03D 9/002
See application file for complete search history.

(56) References Cited

U.S. PATENT DOCUMENTS

| 3,689,944 | A | | 9/1972 | Clayton | |
| 3,988,788 | A | | 11/1976 | Aue | |
| 5,963,991 | A | | 10/1999 | Agosti | |
| 6,003,159 | A | * | 12/1999 | Sadegh | A47K 13/302 4/233 |
| 6,772,451 | B2 | | 8/2004 | Pellati | |
| 7,976,600 | B1 | * | 7/2011 | Safuto | A47K 13/24 4/371 |
| 8,776,278 | B1 | * | 7/2014 | Dorra | A47K 13/302 4/233 |
| 9,138,112 | B2 | | 9/2015 | Ferro | |
| 11,377,832 | B2 | * | 7/2022 | Dorra | A47K 13/302 |
| 2014/0115764 | A1 | * | 5/2014 | Cheng | A47K 13/302 4/222 |
| 2014/0373263 | A1 | | 12/2014 | Plate | |
| 2022/0112704 | A1 | * | 4/2022 | Garrels | A61L 9/20 |

* cited by examiner

*Primary Examiner* — David P Angwin
*Assistant Examiner* — Nicholas A Ros
(74) *Attorney, Agent, or Firm* — Mark C. Johnson; Johnson Dalal

(57) ABSTRACT

A toilet seat cover assembly for automatic cleaning of a toilet seat having a toilet set cover with a top wall having a perimeter, defining a plurality of openings formed completely through the top wall, and configured to cover a toilet seat, with an outer wall extending from the top wall and with an inner wall extending from the top wall, wherein the outer and inner walls are configured to surround the toilet seat. The cover defines a seat channel sized to receive the toilet seat with outer wall spaced apart from an outer side of the toilet seat and the inner wall spaced apart from the inner side of the toilet seat. The assembly is also configured to spray over a top surface of the toilet seat that evacuated caused by pressure differential causing air to flow into the cover through the plurality of openings.

16 Claims, 23 Drawing Sheets

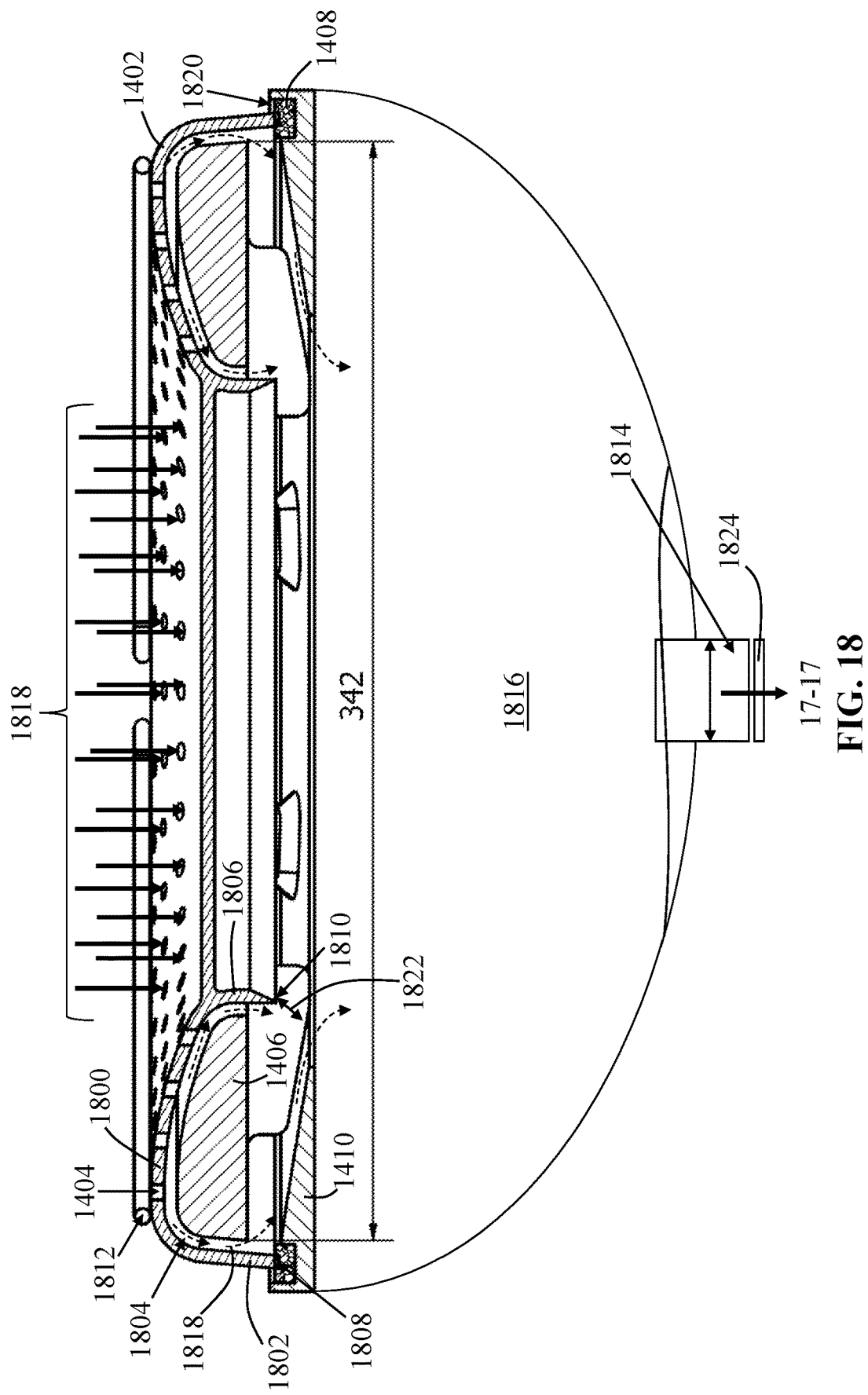

TOILET SEAT COVER ASSEMBLY FOR AUTOMATIC CLEANING

PRIORITY CLAIM

This is a continuation-in-part patent application that claims priority to pending U.S. Ser. No. 16/929,849, the contents of which are incorporated herein by reference.

FIELD OF THE INVENTION

The present invention relates to toilet seat cleaning systems, and more particularly, to an assembly for automatically cleaning a top surface of a toilet seat.

BACKGROUND OF THE INVENTION

Community toilets are often provided as a convenience, but also due to regulatory requirements. Typically, toilet facilities are required to be provided in places open to the public, including retail establishments, restaurants, automotive fuel stations, transportation stations, commercial aircraft, and so on. Given the nature of toilet use, it is imperative to maintain them and to keep them clean and sanitized. A simple way to keep toilets clean would be to have a person clean the toilet after every use. However such an approach would be too impractical and expensive in most instances.

In response, manufacturers have created automatic self-cleaning toilets. These units typically have somewhat complex electromechanical systems that wipe down or otherwise clean the toilet seat after use. Some devices use rotating armatures that sweep across the surface of the toilet seat to clean the surface of the toilet seat. In some units a paper barrier cover that has been placed over the seat is removed, and then a new one is dispensed to cover the seat. While effective, these units are still costly to purchase, install, and maintain. Moving parts can wear out over time and fail, rendering a unit inoperable. Therefore, it would be desirable to minimize the number of moving parts, if not eliminate them, while still having an effective automatic toilet seat cleaning system.

Therefore, a need exists to overcome the problems with the prior art as discussed above.

SUMMARY OF THE INVENTION

The invention provides a toilet seat cover for automatic cleaning that overcomes the hereinafore-mentioned disadvantages of the heretofore-known devices and methods of this general type and that effectively and efficiently cleans the surface of a toilet seat.

With the foregoing and other objects in view, there is provided, in accordance with the invention, a toilet seat cover assembly for automatic cleaning of a toilet seat and having a toilet set cover with a top wall having a perimeter, defining a plurality of openings formed completely through the top wall, and configured to cover a toilet seat, with an outer wall depending from the perimeter of the top wall and having a bottom edge and with an inner wall depending from the top wall and having a bottom edge, wherein the outer and inner walls configured to surround the toilet seat, and defining, with the top wall, the outer wall, and the inner wall a seat channel sized to receive the toilet seat with outer wall spaced apart from an outer side of the toilet seat and the inner wall spaced apart from the inner side of the toilet seat. The outer side of the toilet seat opposes the inner side of the toilet seat and the toilet seat defines a central opening therethrough. The assembly also includes a fluid channel disposed in proximity to the seat channel and having a plurality of nozzles configured to spray over a top surface of the toilet seat.

In accordance with another feature, an embodiment of the present invention includes a hinge member configured to allow movement of the toilet seat cover about a hinge between lifted position and a lowered position, wherein in the lowered position the toilet seat cover is over and covers the toilet seat, and in the lifted position the toilet seat cover is raised to allow use of the toilet seat by a user.

In accordance with yet another feature, an embodiment of the present invention also includes a base member having a surface in which the toilet seat is operably configured to be supported and mounted on, wherein the toilet seat cover has the bottom edge of the outer wall directly and physically coupled to the base member when in the lowered position and the bottom edge of the inner wall physically uncoupled to the base member when in the lowered position and defining a gap between the base member and bottom edge of the inner wall when in the lowered position.

In accordance with an additional feature, an embodiment of the present invention also includes a sealing member disposed at the bottom edge of the outer wall that is configured to create a substantially airtight seal around the bottom edge of the outer wall.

In accordance with a further feature, an embodiment of the present invention also includes a base member defining a sealing channel surrounding a surface in which the toilet seat is operably configured to be supported and mounted on, the sealing channel having the sealing member disposed therein.

In accordance with a further feature of the present invention, the plurality of openings are distributed in a pattern that follows the seat channel around the toilet seat cover.

In accordance with an exemplary feature of the present invention, the fluid channel is formed inside the toilet seat cover at a corner between the outer wall and the top wall of the toilet seat cover.

In accordance with a further feature of the present invention, the fluid channel is formed by a tube disposed in a corner at an inner surface of the outer wall and the top wall of the seat channel.

In accordance with yet another feature, an embodiment of the present invention also includes a base member having a surface in which the toilet seat is operably configured to be supported and mounted on, the toilet seat cover having a lowered position with the bottom edge of the outer wall directly and physically coupled to the base member and the bottom edge of the inner wall physically uncoupled to the base member and defining a gap between the base member and bottom edge of the inner wall.

Also in accordance with the present invention, the cover assembly is utilized in combination with a vacuum-based toilet having a toilet bowl defining a bowl basin and a lower bowl aperture and having a toilet seat rotatably coupled to the toilet bowl, the toilet seat defining a center seat aperture and including a front end, an inner side of the toilet seat defining the center seat aperture, an outer side of the toilet seat, a rear end of the toilet seat, a top surface, a valve operably configured to place the toilet in a flushing position generating an induced vacuum through the lower bowl aperture and in the bowl basin. The improvement includes a toilet seat cover assembly for automatic cleaning of the toilet seat and having a toilet set cover rotatably coupled to the toilet, on the upper rim portion thereon, and with a top wall having a perimeter, defining a plurality of openings formed completely through the top wall, and configured to cover the toilet seat, with an outer wall depending from the perimeter of the top wall and having a bottom edge and with an inner wall depending from the top wall and having a bottom edge, the outer and inner walls configured to surround the toilet seat, and defining, with the top wall, the outer wall, and the inner wall a seat channel sized to receive the toilet seat with outer wall spaced apart from the outer side of the toilet seat and the inner wall spaced apart from the inner side of the toilet seat, wherein the outer side of the toilet seat opposes the inner side of the toilet seat and the toilet seat defines a central opening therethrough. The assembly also includes a fluid channel disposed in proximity to the seat channel and having a plurality of nozzles configured to spray over the top surface of the toilet seat.

In accordance with a further feature of the present invention, the plurality of openings defined by the toilet set cover collectively define a total area substantially equaling a total area of the lower bowl aperture defined by the basin bowl.

Although the invention is illustrated and described herein as embodied in a toilet seat cover for automatic cleaning, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the toilet seat, or from a back end to a front end of the toilet. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 18 depicts a cross-sectional view along section line 17-17 in FIG. 17 and with the toilet seat cover attached to an exemplary toilet bowl assembly in accordance with one embodiment of the present invention;

DETAILED DESCRIPTION

Figure 1:
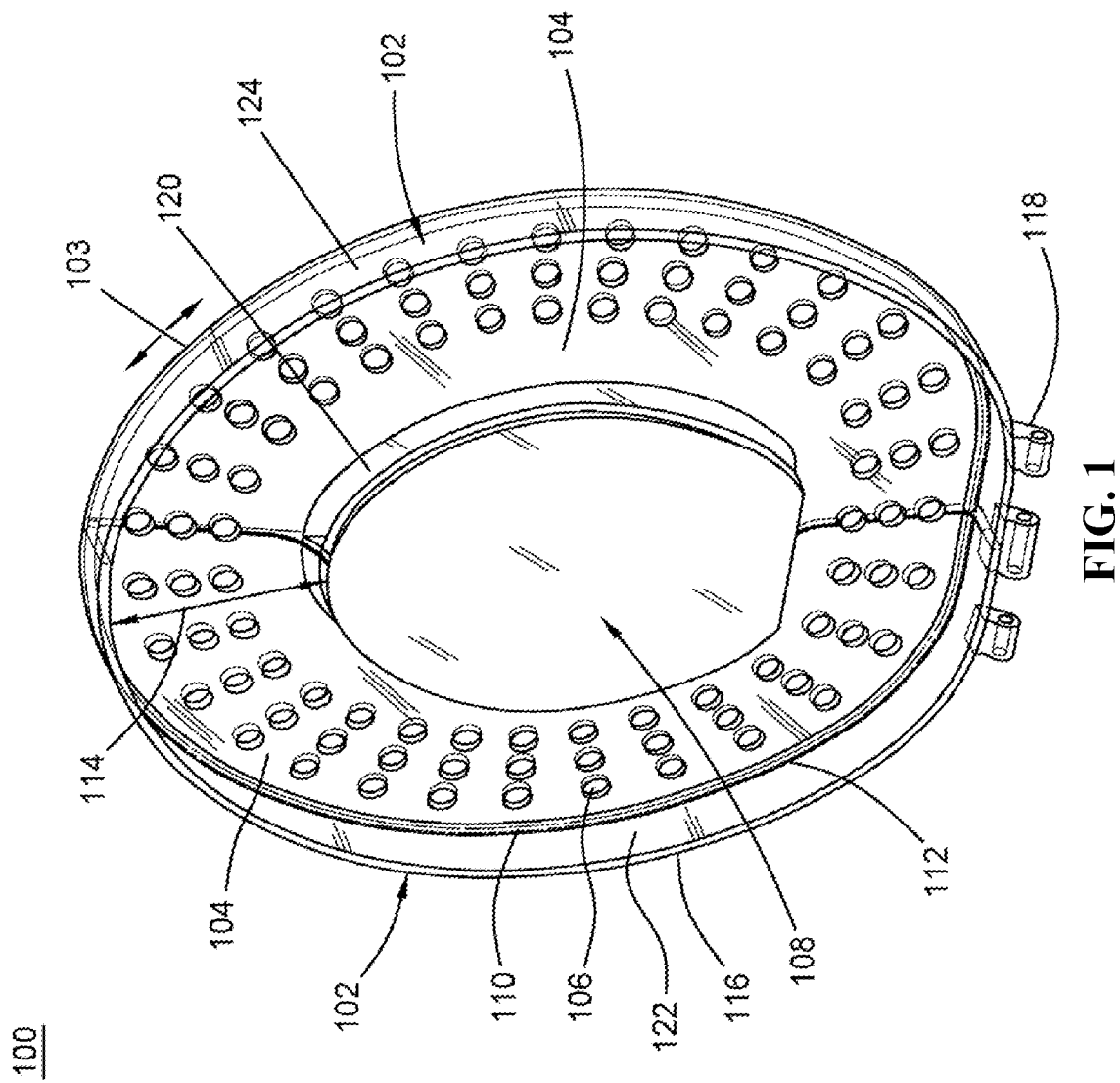
FIG. 1 is a perspective view of the underside of a toilet seat cover for automatically cleaning a toilet seat, with the toilet seat cover shown as being transparent, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The inventive embodiments relate to a toilet seat cleaning system for a toilet that avoids the complexity of a mechanical wiping assembly that physically contacts the toilet seat and is driven by a motor. Embodiments of the invention instead apply a sanitizing fluid to the surface of the seat, in combination with moving air over the surface of the seat, as a result of the toilet being flushed, to both move the sanitizing fluid over the seat surface, as well as to dry the seat surface. Such high vacuum toilets are in widespread use, for example, on airplane and cruise ships, as well as other facilities. These toilet systems are characterized by the vacuum used to evacuate the basin of the toilet after use, rather than using a relatively large volume or water, such as with common residential toilets. As a result, the maintenance costs of providing a self-cleaning toilet are greatly reduced.

Figure 2:
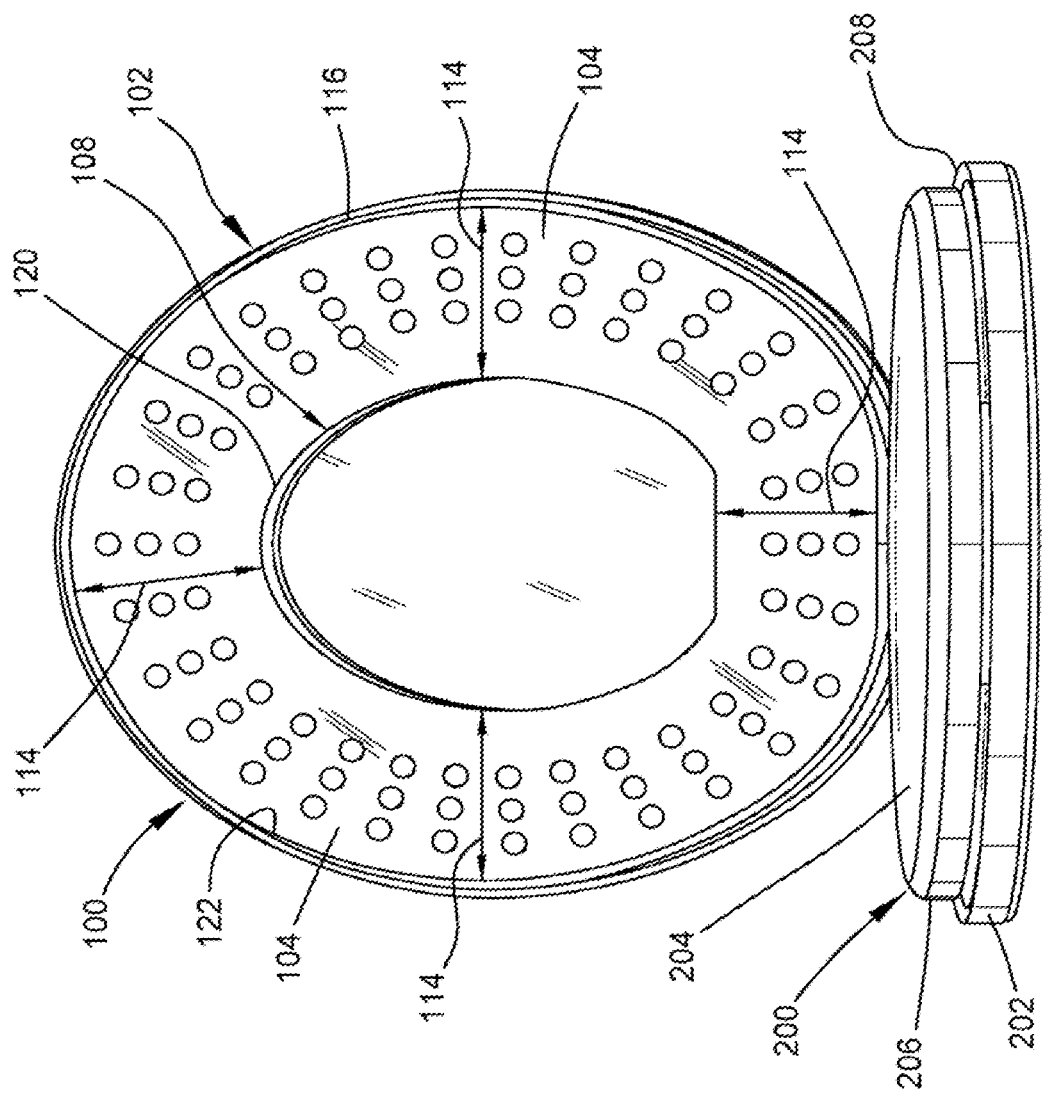
FIG. 2 is a front elevational view of the seat portion of a toilet having a toilet seat cover for automatically cleaning a toilet seat with the toilet seat cover in the lifted position and shown as being transparent, in accordance with some embodiments.

FIG. 1 is a perspective view of the underside of a toilet seat cover 100 for automatically cleaning a toilet seat, with the toilet seat cover 100 shown as being transparent, in accordance with some embodiments. The toilet seat cover 100 is configured to be moveable between an open or lifted position, and a closed or lowered position. The toilet seat cover 100 can be moved manually in some embodiments and in some other embodiments movement of the seat cover 100 can be automated. In the orientation shown in FIG. 2, the toilet seat cover 100 is in a substantially lifted or raised position relative to a basin 202 or base 202, which would expose the toilet seat 206 and toilet basin of the toilet to which the toilet seat cover 100 is attached or otherwise part of when moved into a lowered position, as will be shown and explained. The toilet seat cover 100 is operably configured to provide a flow or spray of sanitizing fluid or liquid, including a vapor, over and/or under the toilet seat 206 and, upon flushing the toilet, generating (with auxiliary equipment or a pressure differential caused by an aircraft while in flight) a pressure differential or vacuum pressure under the toilet seat cover 100 that draws air through holes 106 in the toilet seat cover 100. The underside of the toilet seat cover 100 is configured to direct air, which is drawn through the toilet seat cover 100 by flushing the toilet, over the surface of the toilet seat, thereby moving emitted fluid on the toilet seat and, in embodiments when the base 202 is not utilized, the upper rim of the toilet bowl, and drying the surface of the same for the next use.

The toilet seat cover 100 includes an outer wall 102 the depends from the top of the toilet seat cover 100 at the perimeter 103 of the top, and completely or substantially completely around the entire perimeter 103 of the top. The top of the toilet seat cover 100 is a generally planar portion of the toilet seat cover 100 that forms the main structural element that integrally connects the other elements of the toilet seat cover 100 together, and in FIG. 1 the underside 104 of the top is shown in the majority of the drawing. By "depends from" it is mean that the outer wall 102 extends from the top at the perimeter 103 of the top and forms a skirt-like structure around the perimeter 103 of the top. The outer wall 102 includes an inner surface 122 and an exterior surface 124, and has a bottom edge 130 at which a compliant sealing member 116 can be disposed around the entirety of the bottom edge 130 of the outer wall 102. In the general center of the underside 104 of the toilet seat cover 100 is a plug 108. The plug 108 extends downward from the underside 104 and has an outer side 120. A seat channel is formed between the outer side 120 of the plug 108 and the inner surface 122 of the outer wall 102, in the space indicated by arrow 114, and extending around the underside 104 of the seat cover 100, and being sized to receive the seat 200 in the space between the outer wall 102 and an outer side 120 of the plug 108 when the seat cover 100 is lowered over the seat.

A plurality of openings 106 are formed completely through the top in the portion of the top over the seat channel to allow air to flow through the seat cover 100 to dry the seat after is has been sprayed or otherwise supplied with a sanitizing fluid, sanitizing liquid, or other fluid and/or liquid sprayed on the toilet seat 200. The openings 106 are sized and spaced such that when the toilet is flushed, while the openings 106 allow air to flow through them, they restrict air flow to cause air flowing through them to move at a sufficiently high velocity over the top surface of the seat. The airflow is further enhanced by the sealing member 116 at the bottom of the outer wall 102, which interfaces with a corresponding sealing channel in the basin to create a substantially airtight seal around the toilet seat cover 100. The sealing member 116 therefore acts as a gasket and can be made of a suitably compliant material such as rubber. Thus, air only flows through openings 106 when the toilet is flushed. The toilet seat cover 100 can be seen in the lowered position, over the toilet seat 200, in which the toilet seat cover will perform automated cleaning. In this view the top surface 126 of the top of the cover 100 is in view. The toilet seat 200 sits in the seat channel formed between the outer side 120 of the plug 108 and the inner surface 122 of the outer wall 102. The plurality of openings 106 are formed through the top of the toilet seat cover 100 in correspondence with the seat channel, and over the seat 200. The outer side 120 of the plug 108, inner surface 122 of the outer wall 102, and the underside 104 of the top are positioned such that there is an air gap between the seat 200 and the adjacent structure of the toilet seat cover 100 in the seat channel.

Figure 4:
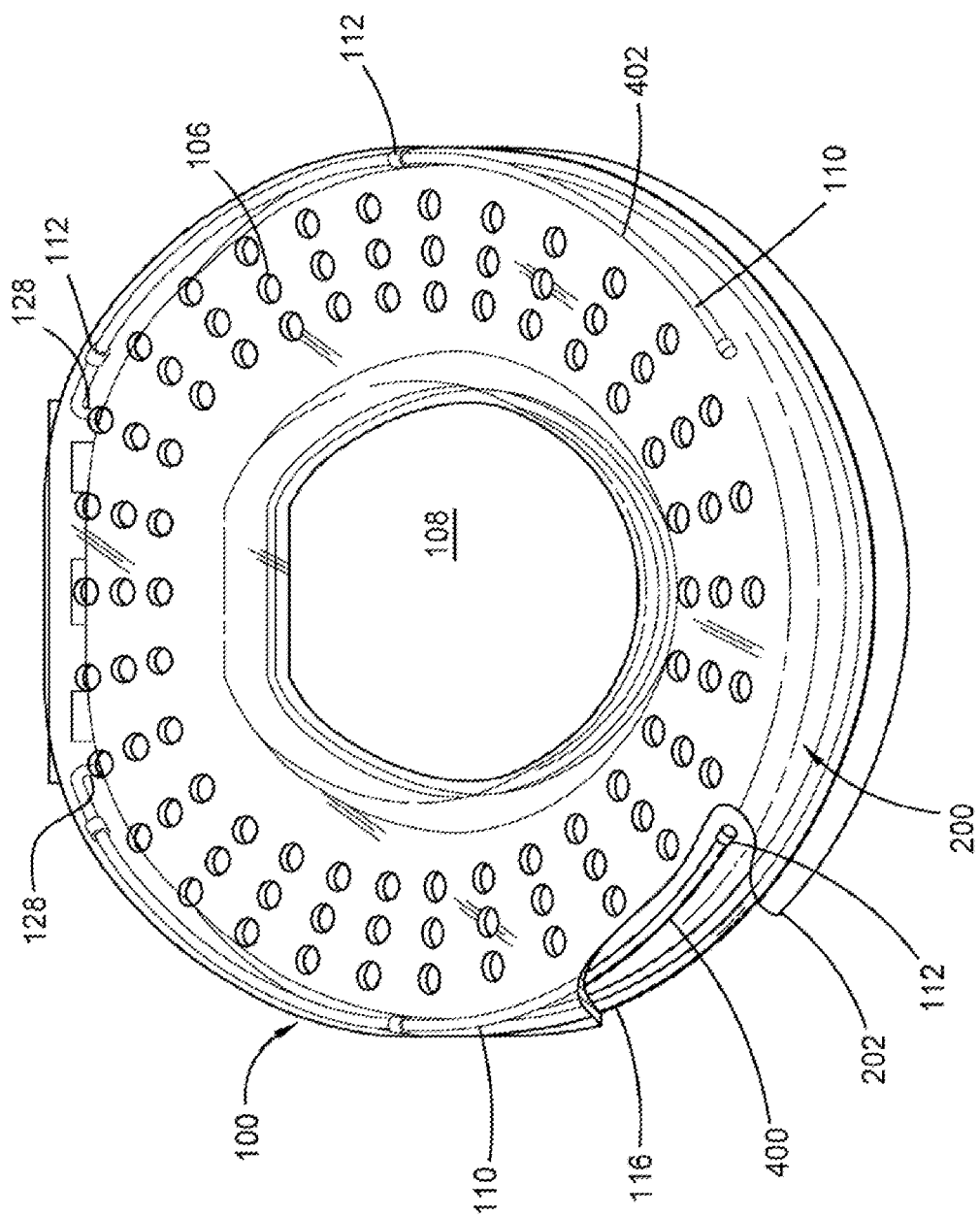
FIG. 4 is a top front perspective view of a seat portion with the toilet seat cover in the lowered position and the toilet seat cover shown as being transparent, in accordance with some embodiments.

Fluid in the fluid channel 110 is first forced through nozzles 112 (as shown in FIG. 4) which are each configured to direct spray over a portion of the seat surface 204, and enough nozzles 112 are provided so that substantially all (75-99%) or the entire surface 204 is covered with sanitizing fluid. Each nozzle covers or is directed toward a different respective area of the top surface 204 of the seat 200. Fluid can be pumped into the fluid channels 110 by a pump in response to a user activation, such as upon actuating a flush control or a dedicated cleaning control. The fluid can be a sanitizing fluid that is a mixture of fluid components which includes a component that aids in evaporation, such as an alcohol or similar component. After spraying the surface 204 of the seat 200, the toilet can then be flushed, which results in a suction or vacuum to remove waste from the basin bowl. As a result, the ambient pressure in the basin bowl is lowered, causing air from outside the toilet to be forced through the plurality of openings 106, and as a result, substantially dries the surface 204 of the seat by forcing fluid off the surface 204 of the seat 200 into the basin bowl, or by evaporation, or both. However, it is also contemplated that the toilet system can be configured to operate the vacuum system in two modes, including a first mode for regular evacuation that uses a high suction for a short time duration, and a second mode for cleaning that uses a lower suction level for a longer time duration. As can be seen here, the fluid channel is located in a portion where the outer wall 102 meets the top surface 126, at the perimeter 103 of the top surface 126. The placement of the fluid channel 110, and particularly the nozzles 112 here ensures that spray is emitted from the nozzles 112 inward, towards the bowl basin, over the top surface 204 of the seat 200. The fluid channel 110 can also be provided equivalently by a tube attached to the seat cover 100 in the same space as fluid channel 110 shown here.

Figure 3:
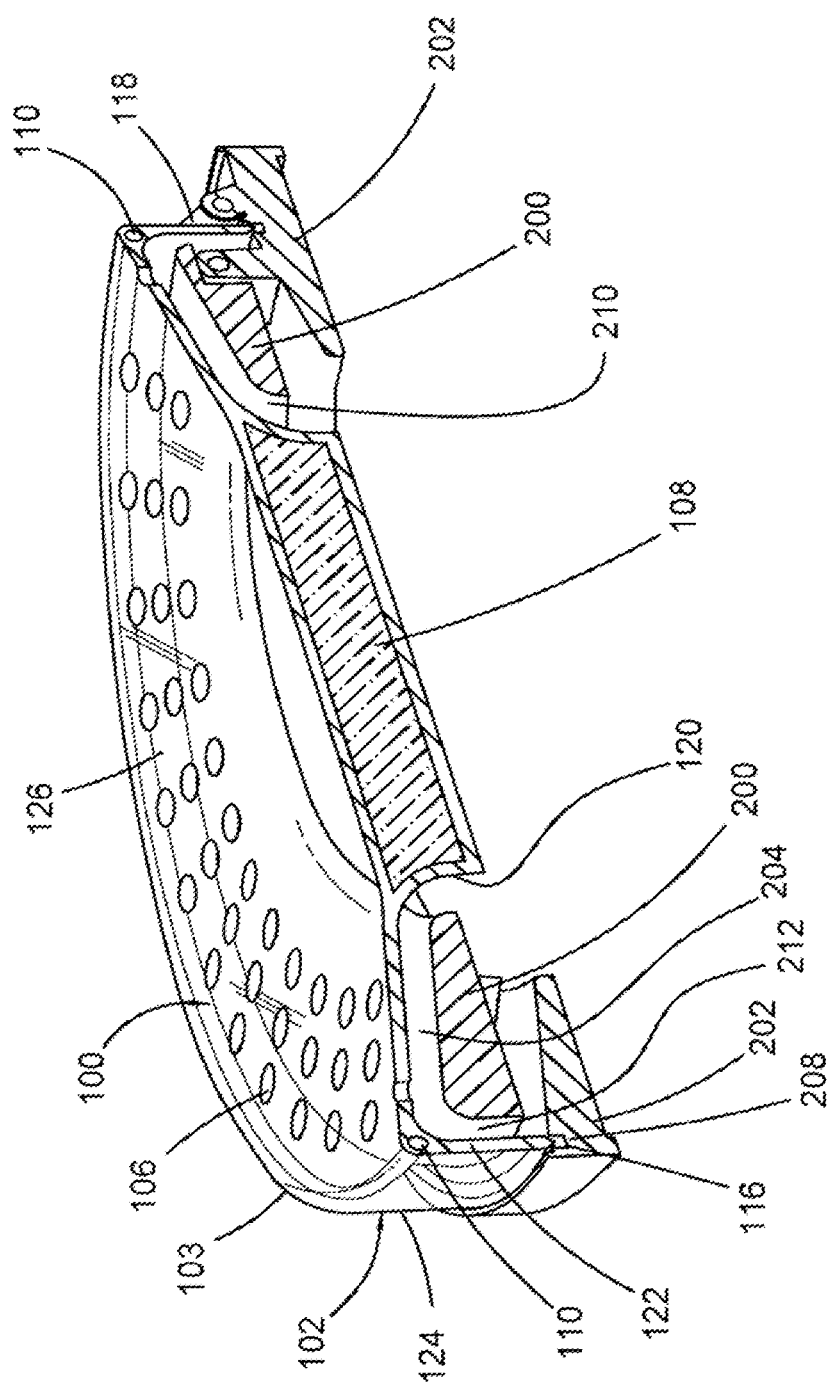
FIG. 3 is an isometric cut-away view of a seat portion with the toilet seat cover in the lowered position with the toilet seat cover shown as being transparent, in accordance with some embodiments.

FIG. 4 is a top front perspective view of a seat portion with the toilet seat cover 100 in the lowered position and the toilet seat cover shown as being transparent, in accordance with some embodiments. The seat cover 100 is shown here, as in the other drawings, as a transparent member for the sake of showing the other components of the toilet system. The seat cover 100 can be made using opaque materials, although by making it transparent is allows a user to see the cleaning operation occur. The fluid channel 110 is shown here as having two branches 400, 402, although it can be one continuous channel around the inside of the top of the outer wall 102. The fluid channel 110 is fed by one or more fluid feeds 128 which can be a tube is similar structure connected to a fluid pump. It can also be seen that the plurality of openings 106 are provided through the seat cover 100, over the seat 200, which ensures a distribution of air flow over the surface of the seat 200. The size and number of openings 106 is selected to ensure sufficient velocity of air flow for a given pressure differential when the toilet is flushed so that the seat surface is dried. Further, as seen in FIG. 3 (as well as FIG. 6), the underside 104 of the top of the seat cover 100 over the seat 200 generally follows the slope of the top surface 204 of the seat 200 to provide a consistent gap width between the surface 204 of the seat 200 and the seat cover 100 in this region. In some embodiments it is contemplated that the gap can become narrower toward the inner side 210 of the seat 200 to increase air velocity and ensure that any fluid that does not evaporate is pulled off the seat surface 204 to leave the seat surface dry.

Figure 5:
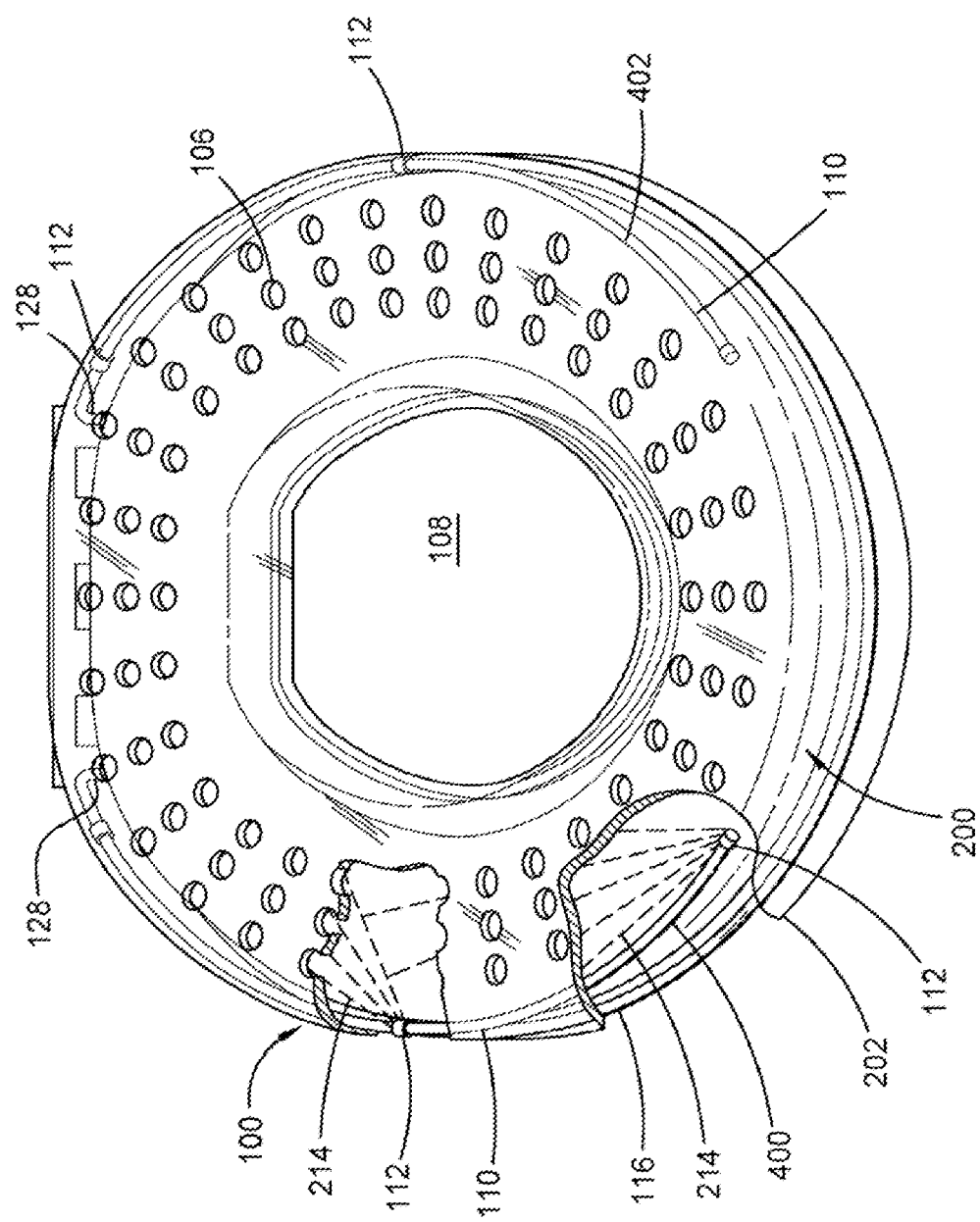
FIG. 5 is a top front perspective view of a seat portion with the toilet seat cover in the lowered position and the toilet seat cover shown as being transparent, showing a cleaning fluid being sprayed onto the toilet seat, in accordance with some embodiments.

FIG. 5 is a top front perspective view of a seat portion with the toilet seat cover 100 in the lowered position and the toilet seat cover 100 shown as being transparent, and showing a cleaning fluid being sprayed onto the toilet seat, in accordance with some embodiments. The fluid spray 214 is represented by lines here to show one arrangement where fluid spray 214 is directional, emanating from the nozzles 112 connected to the fluid channel 110. As shown here, the fluid spray 214 is generally directed along the surface 204 of the seat 200, and not towards the basin bowl or the plug 108. In some embodiments, the fluid spray 214 can be generally directed at about a 45-degree angle to the inner surface 122 of the outer wall 102, with each nozzle 112 spraying in same direction, relative to the inner surface 122 of the outer wall 102. By liming the angle of spray, more of the sprayed fluid will end up on the seat surface, rather than going directly into the basin, as would happen with a wide angle of spray. Accordingly, nozzles having a spray angle of about forty-five degrees require less fluid to cover the seat surface than if the nozzles had a spray angle of, for example, one hundred twenty degrees. The nozzles 112 are positioned so as to create some overlap in fluid spray 214 from one nozzle to the next along the fluid channel 110 to ensure substantially even fluid coverage of the seat surface 204. After the seat 200 is sprayed with the fluid, there can be a pause of a short duration before the toilet is flushed in order to allow sanitizing action to occur before the fluid is removed from the surface 204 of the seat 200. In one embodiment, there is a program stored on a memory and operably configured to be executed by one or more processors communicatively coupled and/or physically coupled to the assembly and that causes the cover 100 to lock or substantially resists rotational movement thereof, emit the liquid and fluid on the toilet seat 200, and induce the pressure differential within the toilet bowl and seat channel 114. The program may also selectively unlock or otherwise enable efficient and unresisted movement of the cover when the cleaning process is finished.

Figure 6:
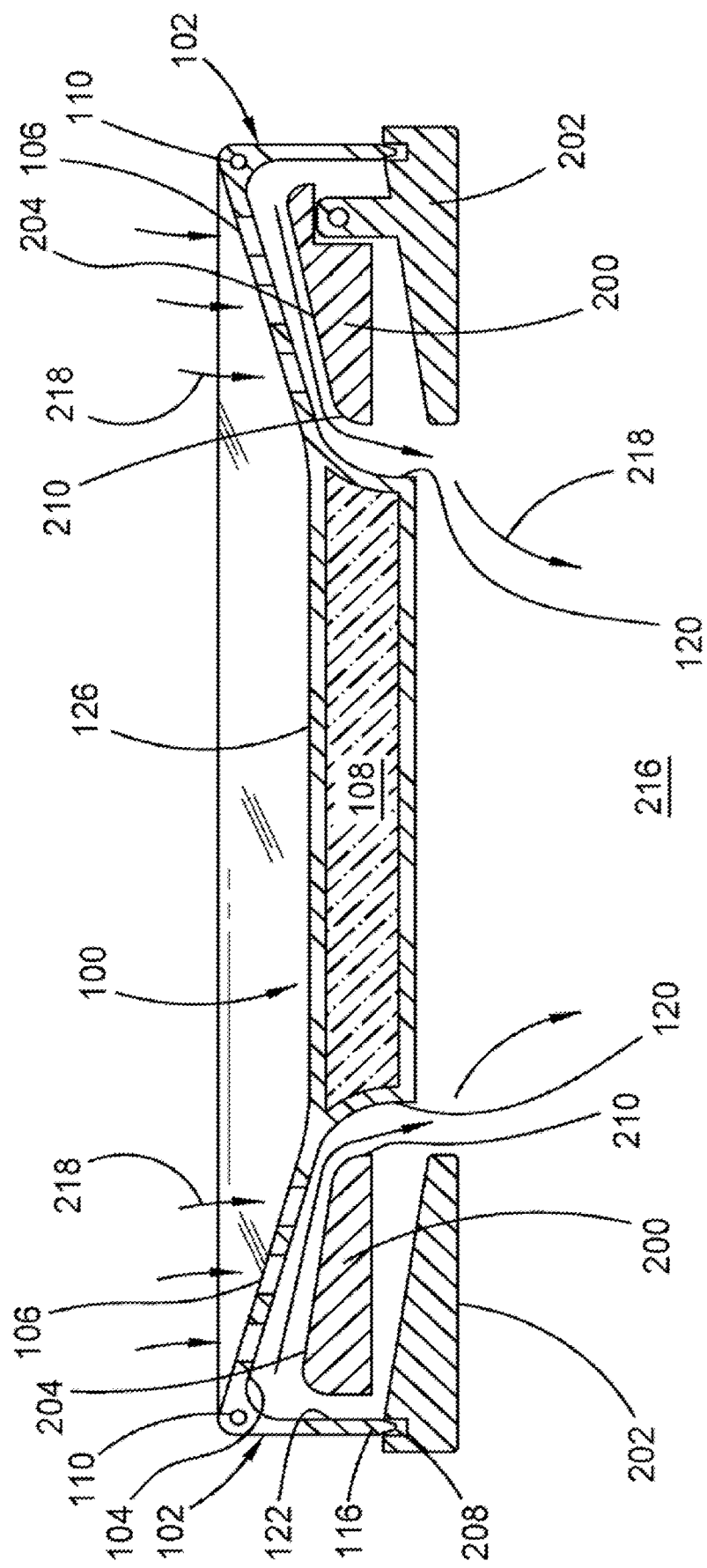
FIG. 6 shows a cross sectional view of a seat portion with the toilet seat cover in the lowered position, taken along line AA of FIG. 4, in accordance with some embodiments.

FIG. 6 shows a cross sectional view of a seat portion with the toilet seat cover in the lowered position as depicted in FIG. 4, in accordance with some embodiments. Although not shown in FIG. 4, the cross-section view shown here assumes the fluid channel 110 continues through the front of the seat 100. As shown here, the fluid channel 110 is shown within the material of the seat cover 100. Alternatively, the fluid channel can be a tube or other hollow member that affixed into the corner at the inside surface 122 of the outer wall and the underside 104 of the top of the seat cover 100. After the sanitizing fluid has been sprayed onto the top surface 204 of the seat 200, the toilet is flushed, causing ambient air to flow through openings 106, over the surface 204 of the seat 200, as indicated by flow lines 218, into the basin bowl 216. As the air flows over the surface 204 of the seat 200, it facilitates both movement and evaporation of the fluid on the surface 204. Air is prevented from flowing under the outer wall 102 by the substantially airtight engagement of sealing member 116 in sealing channel 208 of the basin 202. The plug 108 has an outer side 108 that is spaced apart from the inner side 210 of the seat 200 to facilitate air flow into the basin bowl 216. In that sense, the plug 108 is an extension from the underside 104 of the top of the seat cover 100, and to ensure proper airflow, only a wall corresponding to the outer side 120 of the plug 108 is needed. Thus, the plug 108 could alternatively be formed as a wall that forms a ring around the central portion of the seat cover 100 at the underside of the seat cover 100.

Figure 7:
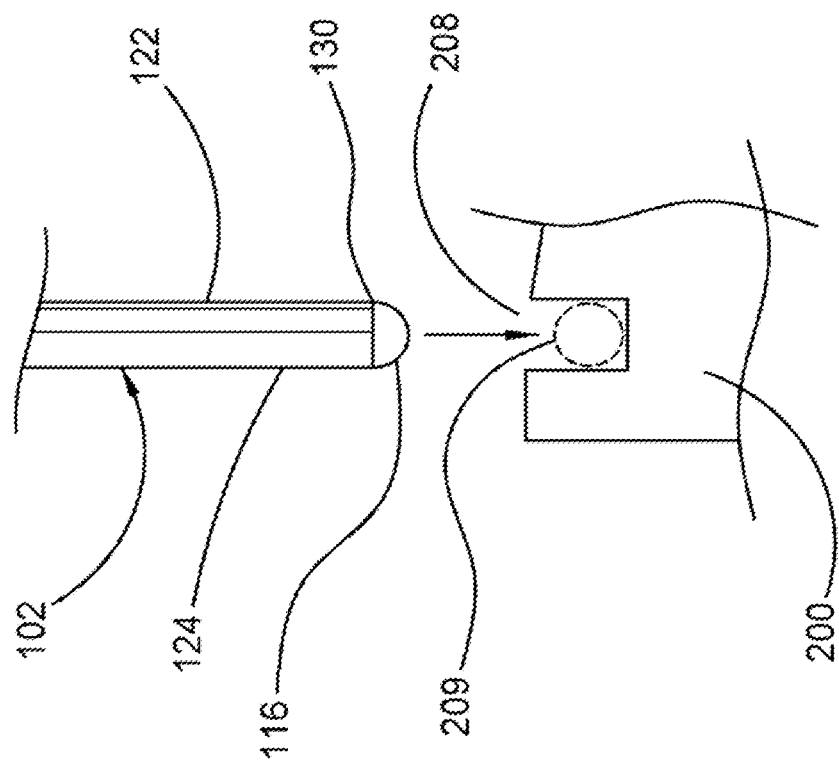
FIG. 7 is a side detail view of an outer wall of a seat cover engaging an air seal upon being lowered, in FIG. 7 accordance with some embodiments.

FIG. 7 is a side detail view of an outer wall 102 of a seat cover engaging an air seal upon being lowered, in accordance with some embodiments. Specifically, the bottom edge 130 of the outer wall 108 is coupled to a sealing member 116, which is a compliant material, such as, for example, rubber. The sealing member mates into a sealing channel 208 formed in the top of the basin 200 (or equivalent seat support structure). The sealing member 116 and sealing channel 208 are sized so that there is contact on the bottom and sides of the sealing member 116 with the corresponding sides and bottom of the sealing channel 208 when the seat cover 100 is lowered into the lowered position. The contact need only be enough to substantially block air from being drawn under the sealing member 116. In some embodiments, the sealing channel 208 may include a sealing member 209, such as an O-ring or similar compliant member, that interface with the bottom 130 of the outer wall 102, or with the sealing member 116 if present. In some embodiments, upon the toilet being flushed, the force on the top of the seat cover 100 due to the pressure differential can be enough to cause the sealing member 116 to bear against the sealing channel (or sealing member 209) to form a sufficiently air-tight seal. In other embodiments, the bottom edge 130 is forcibly placed against the basin or base 202 or upper rim of the toilet bowl, and in some cases is disposed in a flush configuration, solely by the pressure differential, thereby also causing a sufficiently air-tight seal.

Figure 8:
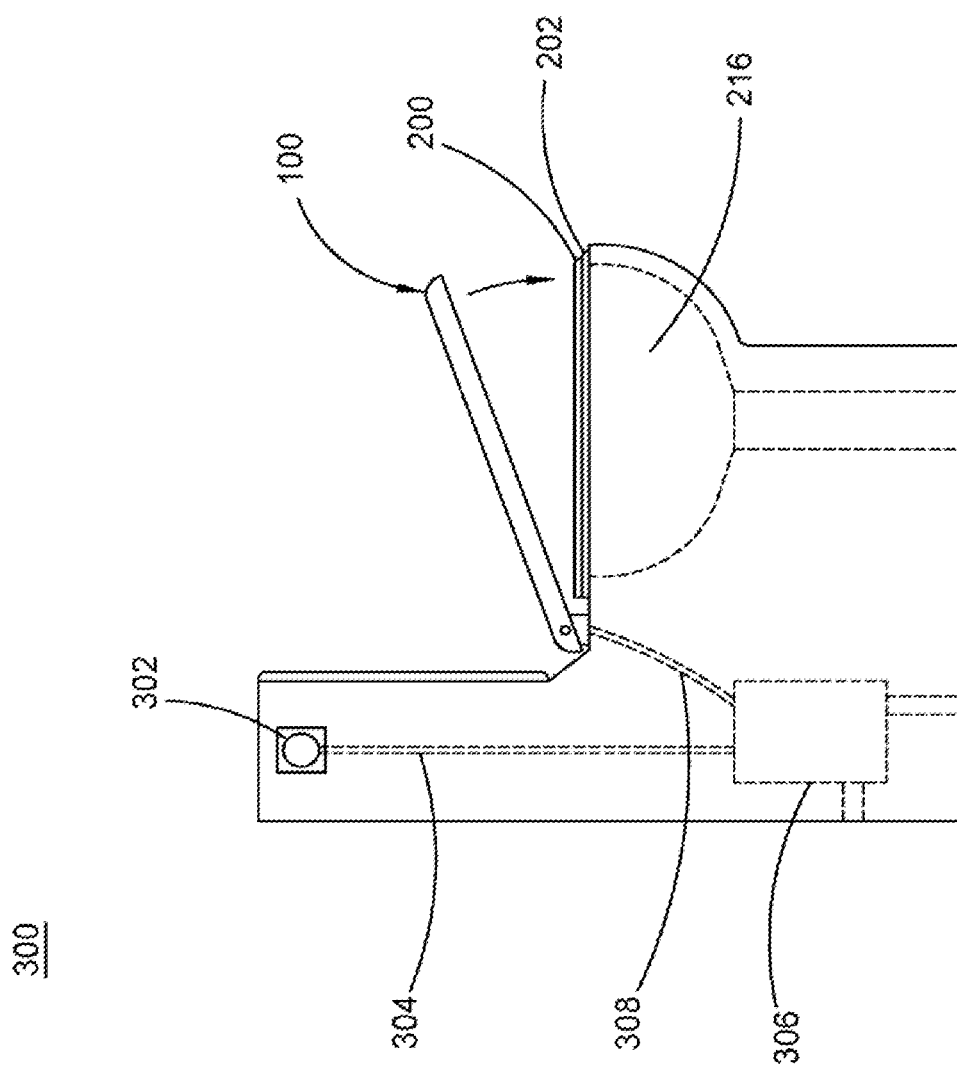
FIG. 8 is a side view of a toilet having a seat portion including a toilet seat cover for automatically cleaning a toilet seat, in accordance with some embodiments.

FIG. 8 is a side view of a toilet 300 having a seat portion including a toilet seat cover 100 for automatically cleaning a toilet seat, in accordance with some embodiments. The toilet 300 can be, for example, a toilet for a commercial aircraft or ship. In other embodiments the toilet 300 can be a residential toilet, or a toilet installed in a facility open to the public, or in a commercial setting. The toilet 300 includes a flush actuator 302 that, when actuated, initiates a flush action of the toilet. When using the toilet 300, the toilet seat cover 100 will be in the lifted position. After, or before, using the toilet 300, the user can lower the seat cover 100 into the lowered position to cover seat 200. A pump 306, responsive to the flush actuator 302 by a control line 304, will pump a quantity of sanitizing fluid into the fluid channel 110 of the seat cover 100 though a fluid feed 308, causing a fluid spray to be sprayed of the surface of the seat 200, under the toilet seat cover 100. When the toilet 300 is flushed, air pressure in the basin bowl 216 is reduced, causing air to flow through the openings 106 of the seat over 100, drying the surface of the seat. In some embodiments the pump 306 can be operated independently of the flush actuator 302, by a separate, dedicated pump control actuator. In that case, the user would simply lower the seat cover 100, then actuate the pump 306, and then actuate the flush actuator 302. It is further contemplated that a motor control system can be used to raise and lower the seat cover 100. Operation of the actuator 302 can initiate a cleaning cycle where the motor system lowers the seat cover from the raised to the lowered position. Then fluid is pumped into the fluid channel 110 to cause the fluid to be sprayed (mist, vapor, etc.) over the seat surface. A pause can then be observed (e.g., with an executable program) to allow the sanitizing fluid to interact with any contaminants on the seat surface. After spraying and any applicable pause, the toilet is then flushed using suction provided by a toilet suction system, as is well known. After the suction is ended, the seat cover 100 can be raised back to the raised position. By making the seat cover transparent, the user can see the action of the spray and drying cause by the suction to give the user peace of mind that the seat surface has been cleaned and sanitized.

Figure 9:
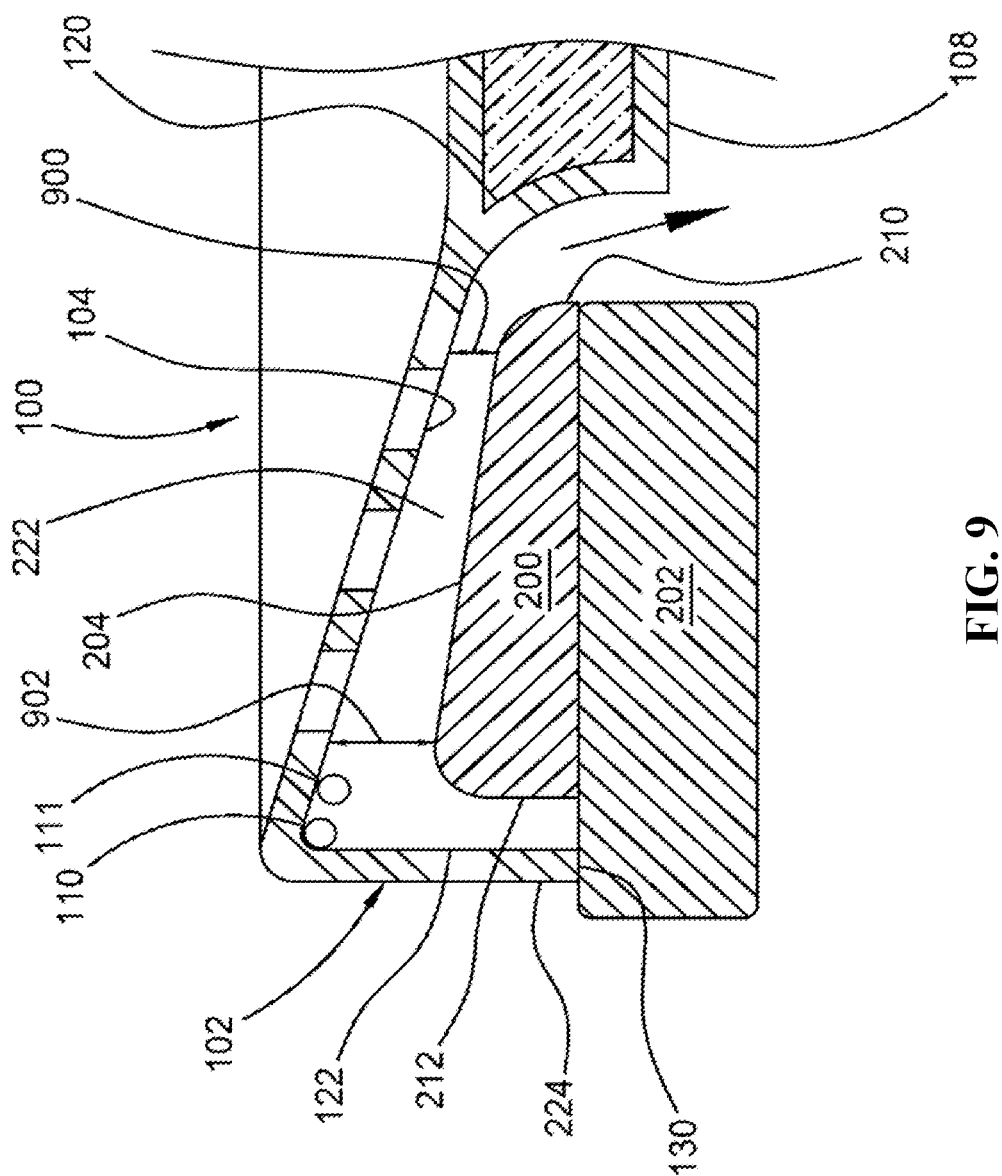
FIG. 9 shows a side cross sectional view of a toilet system including a toilet seat cover for automated cleaning of a toilet seat, in accordance with some embodiments.

FIG. 9 shows a side cross sectional view of a toilet system including a toilet seat cover for automated cleaning of a toilet seat, in accordance with some embodiments. In an alternative configuration, the toilet seat cover 100 provides a seat channel 222 formed on the underside of the toilet seat cover 100 between the outer surface 120 of the central plug 108 structure and the inner surface 122 of the outer wall 102. However, rather than providing openings through the top of the toilet seat cover, the outer wall 102 is configured such that the bottom edge 130 of the outer wall 102 leave a gap 224 between the bottom edge 130 of the outer wall and the top of the basin 202 to allow air to flow under the outer wall and over the surface 204 of the seat 200. The gap 224 can be continuous around the bottom edge 130 or a plurality of gaps can be provided at intervals along the bottom edge to ensure sufficient air flow velocity. In the arrangement shown, air can flow through the gap 224, over the surface 204 of the seat, and into the basin bowl 216. The spacing between the outer side 212 of the seat 200 and the inner surface 122 of the outer wall 102 of the toilet seat cover 100 must be sized properly to allow sufficient flow volume and flow velocity over the top surface 204 of the seat. Likewise with the spacing between the inner side 210 of the seat 200 and the outer side 120 of the plug 108 can be configured to achieve a sufficient flow velocity of air. Furthermore, the spacing 900 between the top surface 204 of the seat 200 near the inner side 210 and the top of the seat channel 104 can be different than the spacing 902 near the outer side 212. In some embodiments spacing 900 can be less than that of spacing 902 to ensure sufficient flow velocity of air to pull any fluid that does not evaporate into the basin bowl 216. Furthermore, in this view, the fluid channel 110 is formed using a tube that is mounted in the corner formed where the inside surface 122 of the outer wall 102 meets the underside of the top, or the top of the seat channel 104. The tube can be installed into the seat cover using, for example, glue or mechanical retaining features, and nozzles can be distributed along the tube to achieve the described spray effect of FIG. 5. Additionally, it is contemplated that a light source 111 can be provided in the seat channel that emits a germicidal ultraviolet light (UV-C) in the wavelength range of 220 nm to 280 nm.

Figure 10:
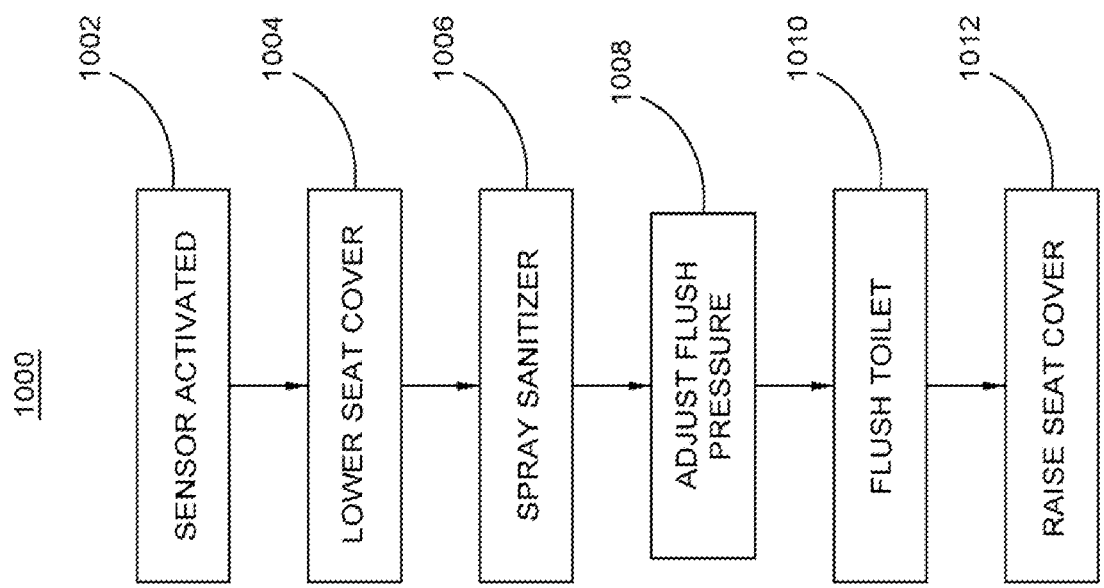
FIG. 10 is a flow chart diagram of a method of operation for a toilet configured for self-cleaning of the seat, in accordance with some embodiments.

FIG. 10 is a flow chart diagram of a method 1000 of operation for a toilet configured for self-cleaning of the seat, in accordance with some embodiments. The method assumes a toilet configured substantially as shown in the described drawings, and in particular, FIGS. 1-9. When a user wants to have the seat of the toilet sanitized and clean, the user first actuates a sensor (e.g., 1002) or the mechanical equivalent to start the process in step 1002. The sensor actuation causes a motor control unit to lower the seat cover in step 1004. The seat cover can be lowered by controlling a motor or motors inside a control unit in the toilet that is coupled to hinge boss or equivalent attachment features of the seat cover. When the seat cover is fully lowered, the outer wall of the seat cover, at its lower edge, is in contact with the top of a seat support member (e.g., the basin) to create a substantially airtight seal. In step 1006 the control unit can actuate a pump or pumps to cause the sanitizing fluid to be released or sprayed from the nozzles coupled to the fluid channel. The pump or pumps can be enabled for a preselected period of time to ensure sufficient coverage of the surface of the seat with the sanitizing fluid. In step 1008 it is contemplated that the toilet system may have two modes of operation with respect to the suction being used. For example, the actuator 302 may have two different buttons: One for flushing and one for cleaning. By pressing the button for flushing a high suction is applied to the basis by the toilet system for a relatively short duration. When the button for cleaning is pressed, a lower level of suction may be used (or the same level) for a longer duration to ensure drying of the seat. In other embodiments the same suction and duration is used for both flushing and cleaning. Thus, in step 1008, the flush pressure, or suction, may be adjusted to a cleaning mode, rather than a standard flush mode. In step 1010 the toilet is flushed using the level of suction applied in step 1008, if so adjusted. In step 1010 the seat surface is dried as a result of the suction pulling air through the openings in the seat cover and over the surface of the seat. Based on the mode used in step 1008, the flushing in step 1010 lasts for a preselected duration of time, which can be based on choosing the cleaning mode, rather than the standard flush mode. In step 1012, once the flush operation is over, the seat cover can be raised, allow use of the freshly cleaned seat.

Figure 11:
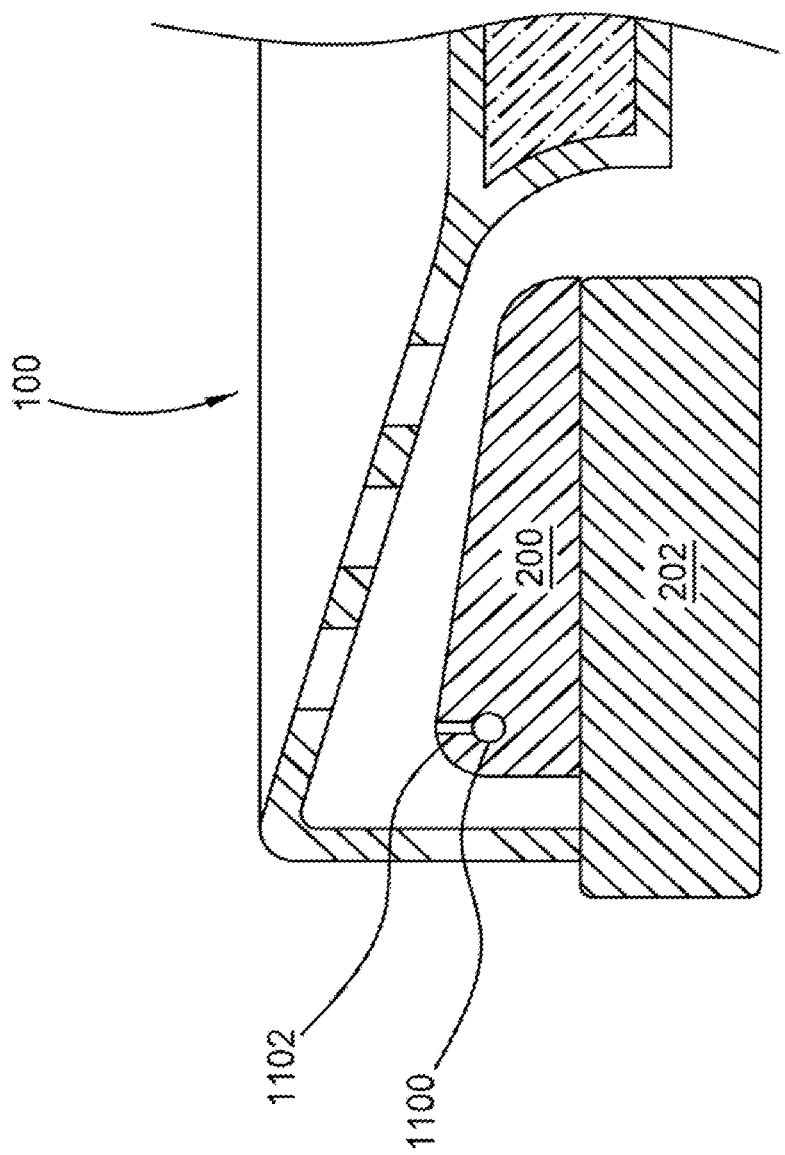
FIG. 11 shows a side cross sectional view of a toilet system including a toilet seat cover for automated cleaning of a toilet seat, in accordance with some embodiments.
Figure 13:
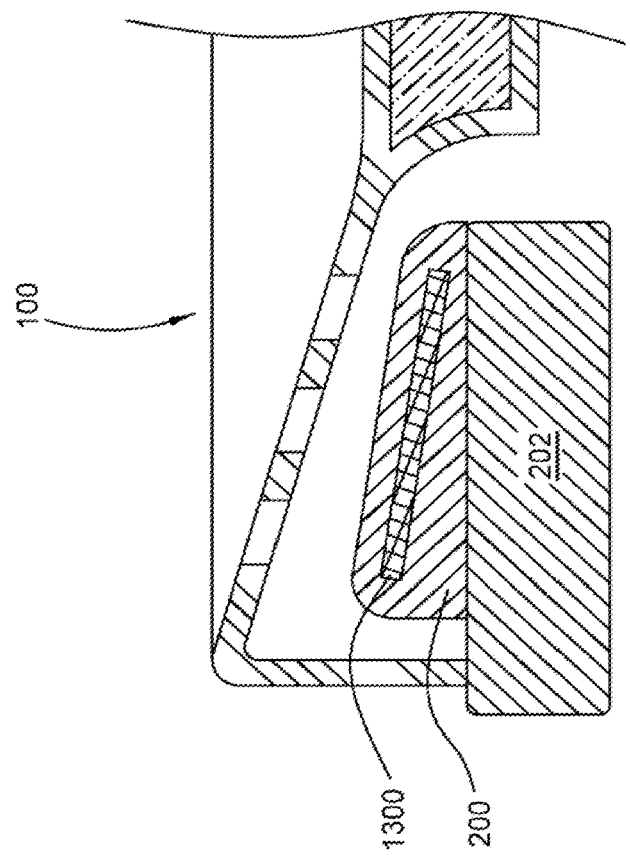
FIG. 13 shows a side cross sectional view of a toilet system including a toilet seat cover for automated cleaning of a toilet seat, in accordance with some embodiments.
Figure 12:
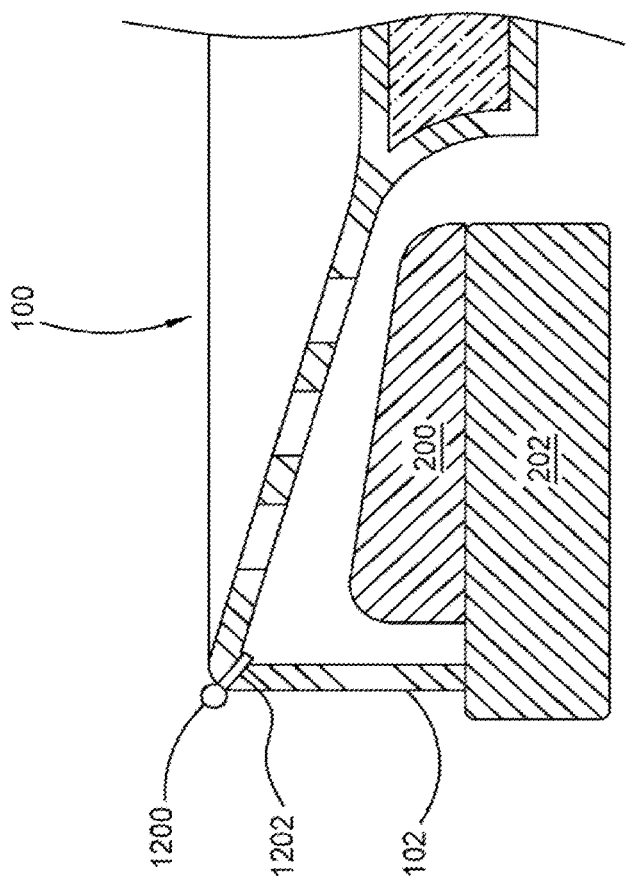
FIG. 12 shows a side cross sectional view of a toilet system including a toilet seat cover for automated cleaning of a toilet seat, in accordance with some embodiments.
Figure 15:
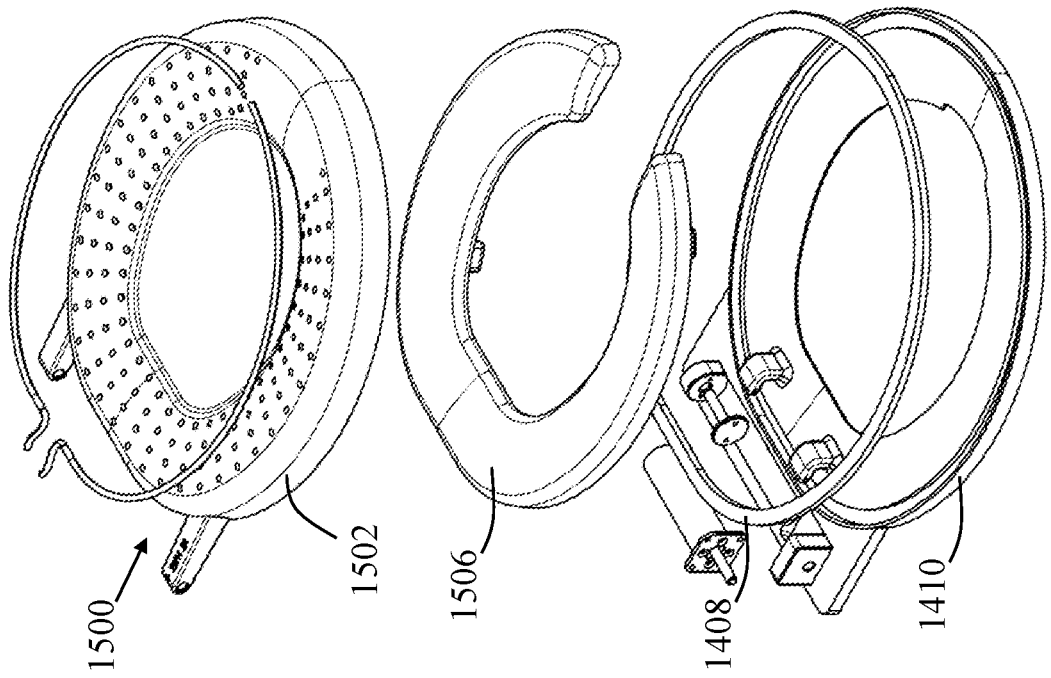
FIGS. 14-15 depict exploded views of toilet seat cover assemblies for automatic cleaning in accordance with embodiments of the present invention.
Figure 14:
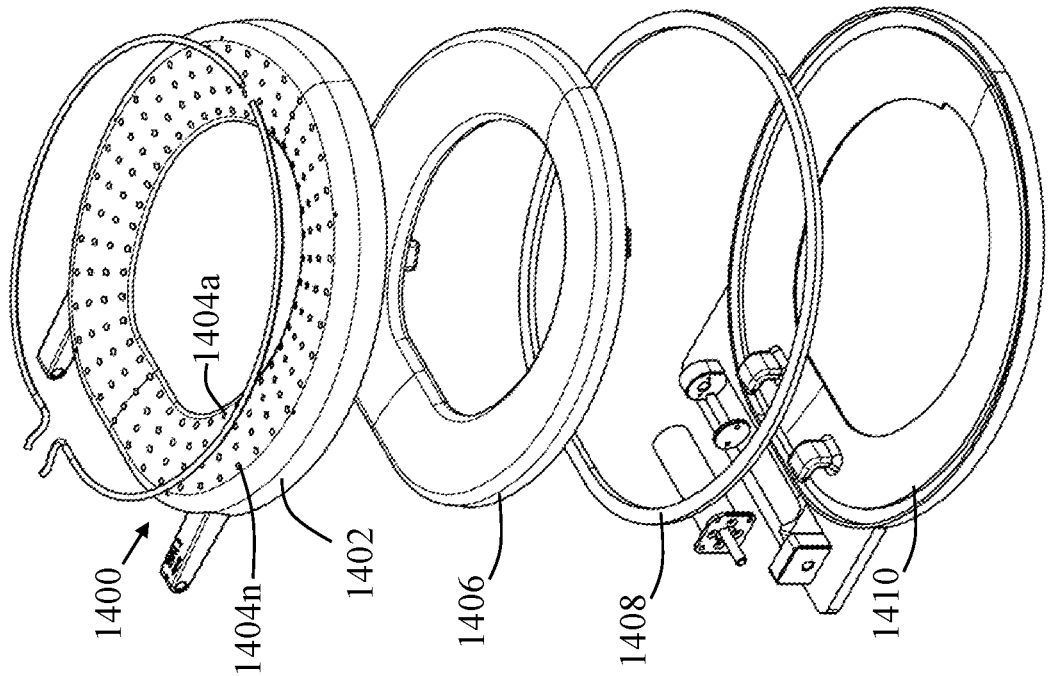
Figure 16:
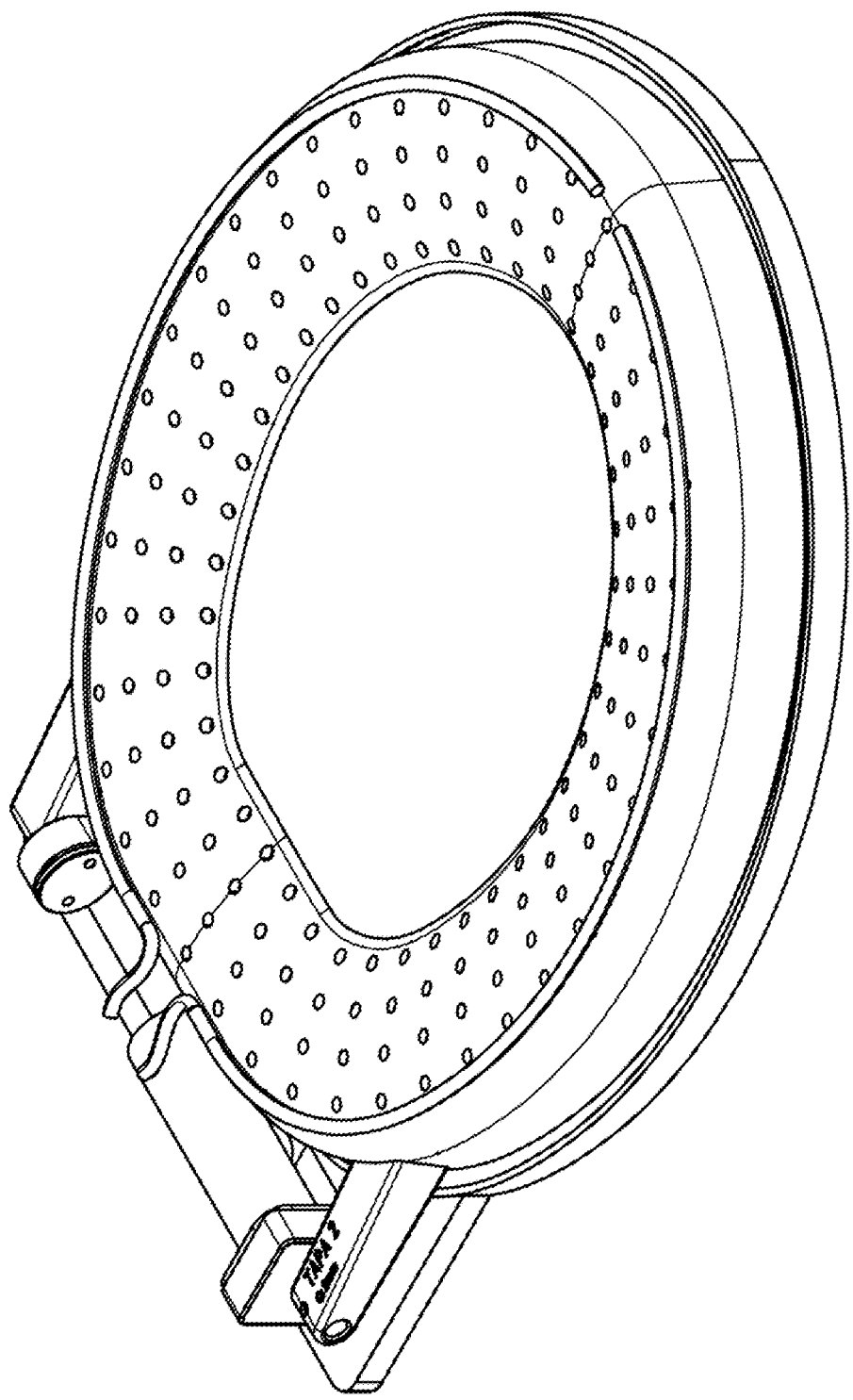
FIG. 16 depicts a perspective view of the toilet seat cover for automatic cleaning illustrated in FIG. 14.
Figure 17:
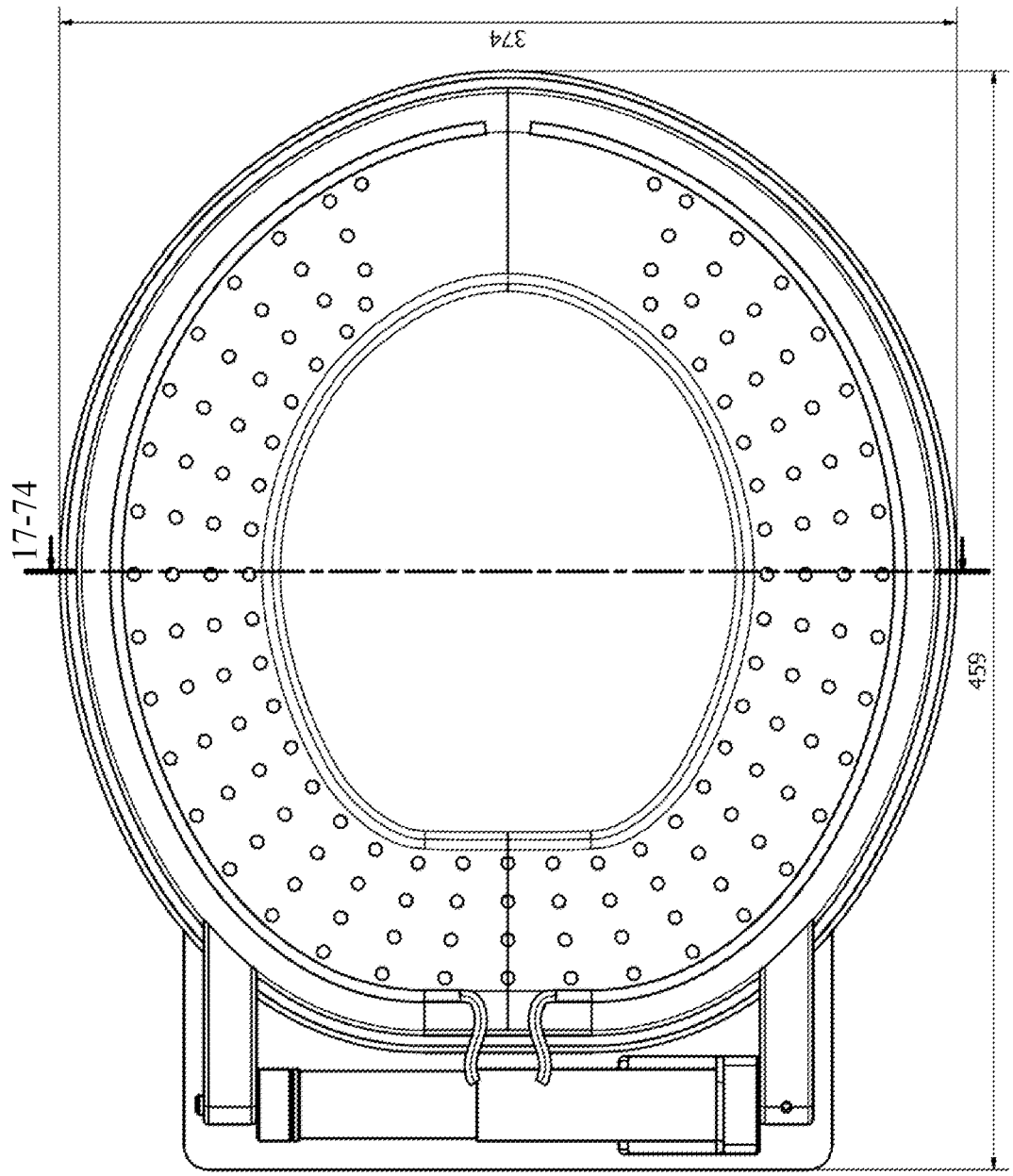
FIG. 17 depicts a top plan view of the toilet seat cover for automatic cleaning illustrated in FIG. 17.
Figures 19, 20:
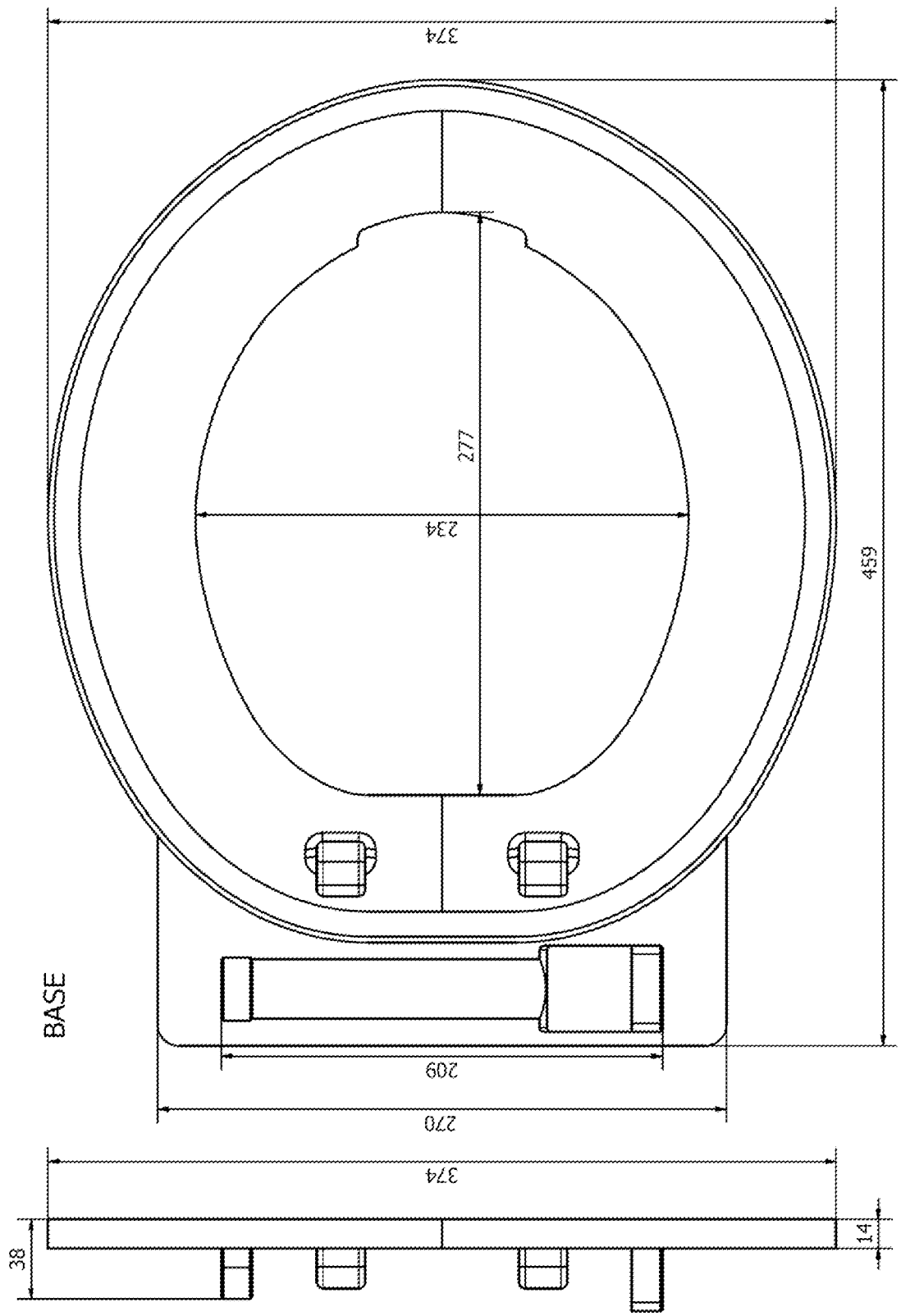
FIGS. 19-20 depict a base member utilized with the toilet seat cover assembly in accordance with one embodiment of the present invention.
Figure 22:
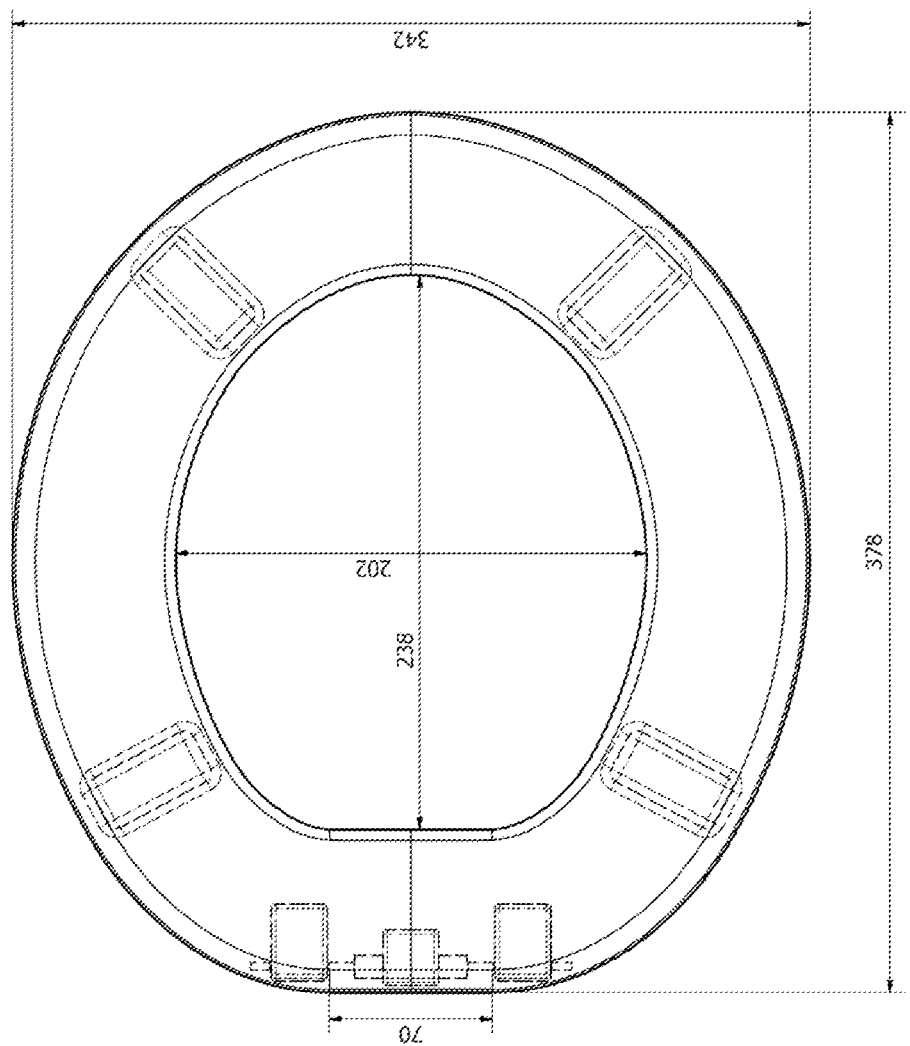
FIGS. 21-22 depict a toilet seat utilized with the toilet seat cover assembly in accordance with one embodiment of the present invention.
Figure 21:
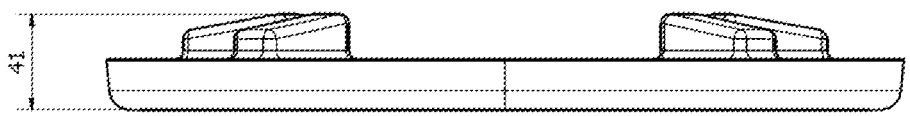
Figure 23:
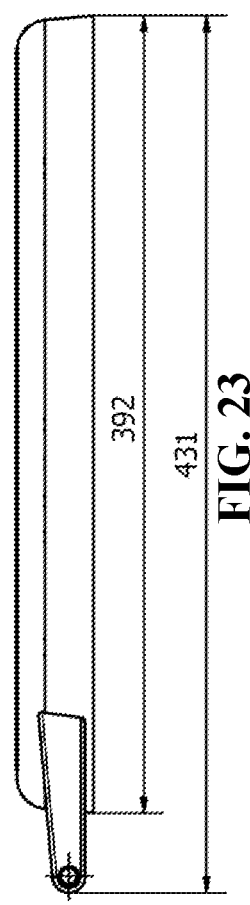
FIGS. 23-24 depict a toilet seat cover utilized with the toilet seat cover assembly in accordance with one embodiment of the present invention.
Figure 24:
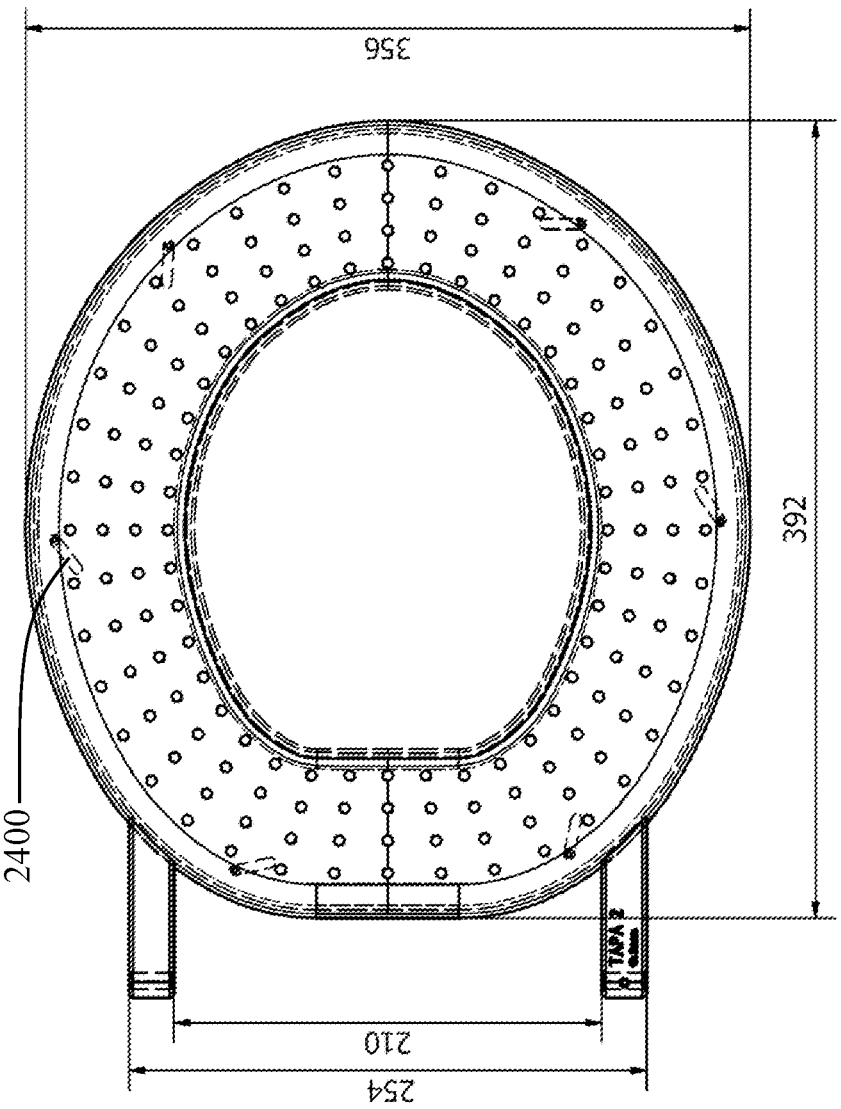
Figure 25:
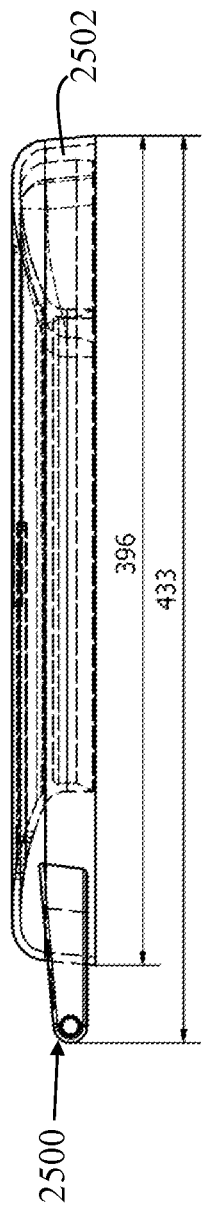
FIGS. 25-26 depict another embodiment of a toilet seat cover utilized with the toilet seat cover assembly in accordance with one embodiment of the present invention.
Figure 26:
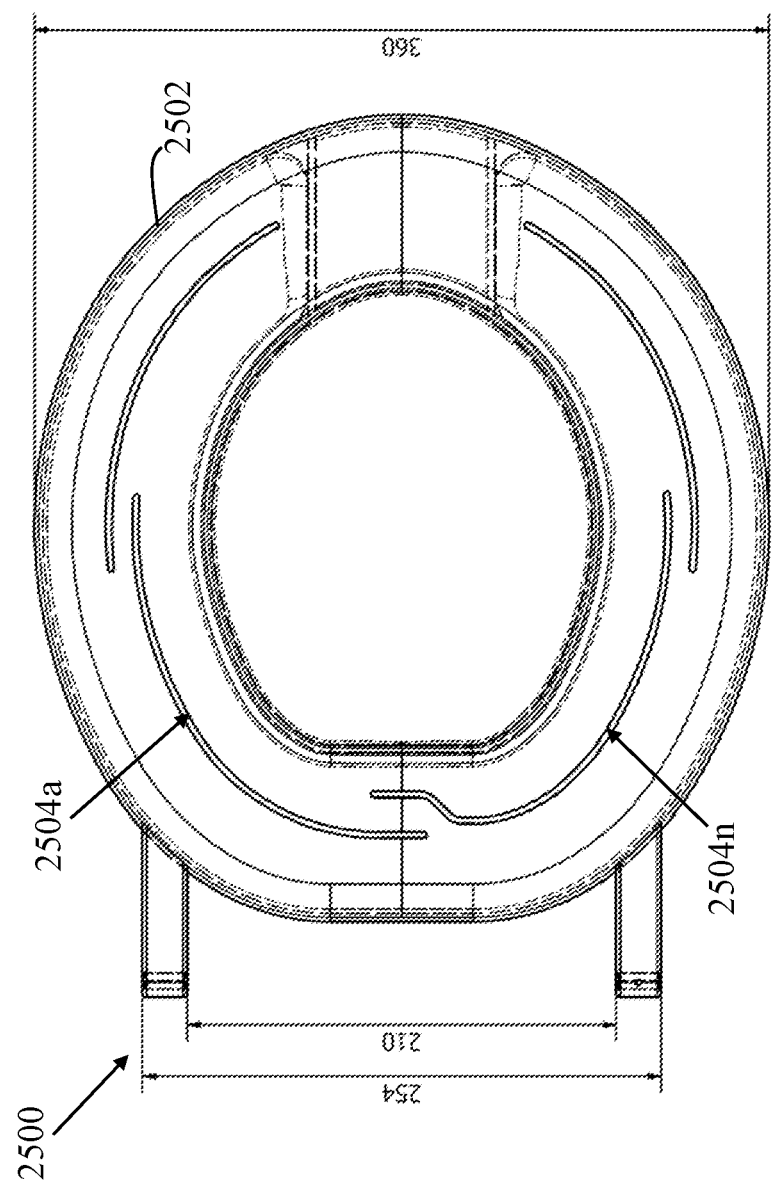
Figure 27:
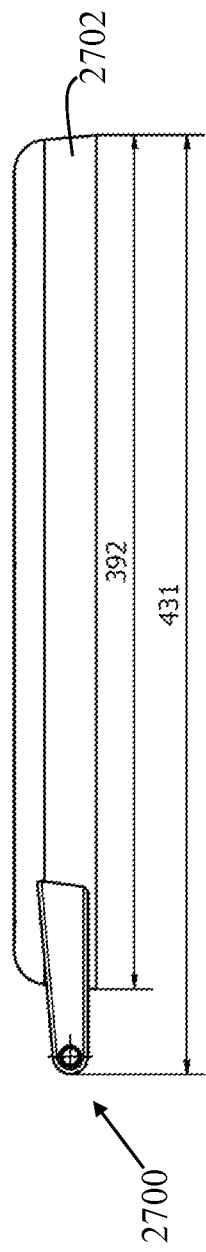
FIGS. 27-28 depict another embodiment of a toilet seat cover utilized with the toilet seat cover assembly in accordance with one embodiment of the present invention.
Figure 28:
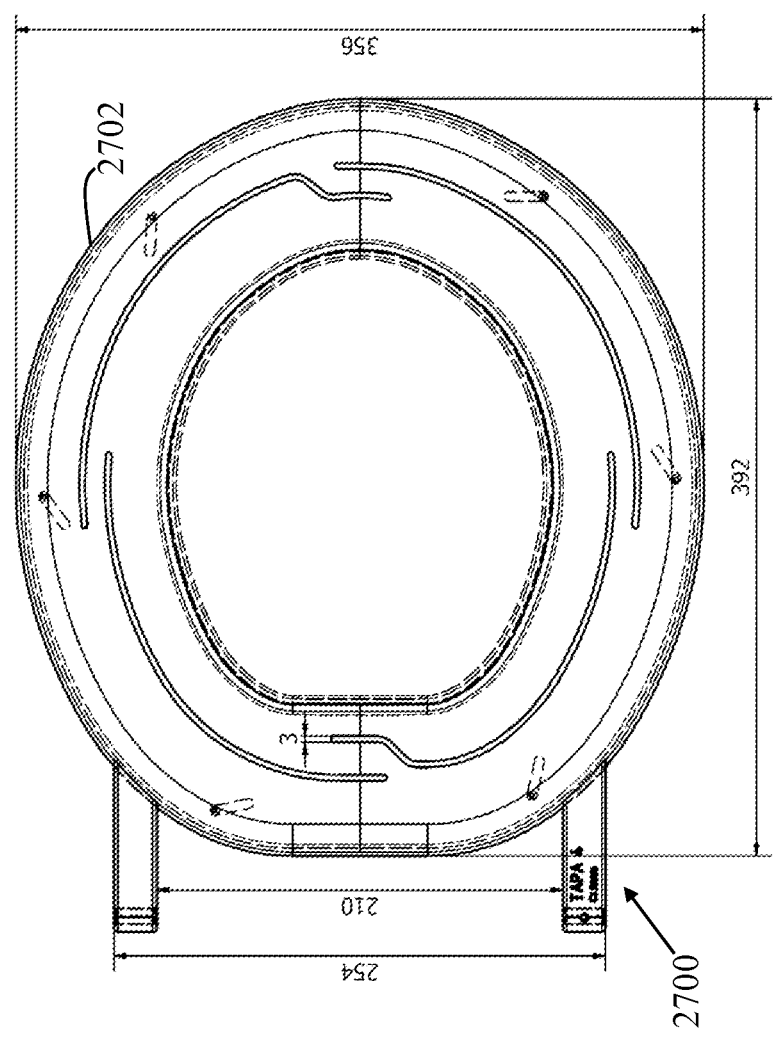
Figure 29:
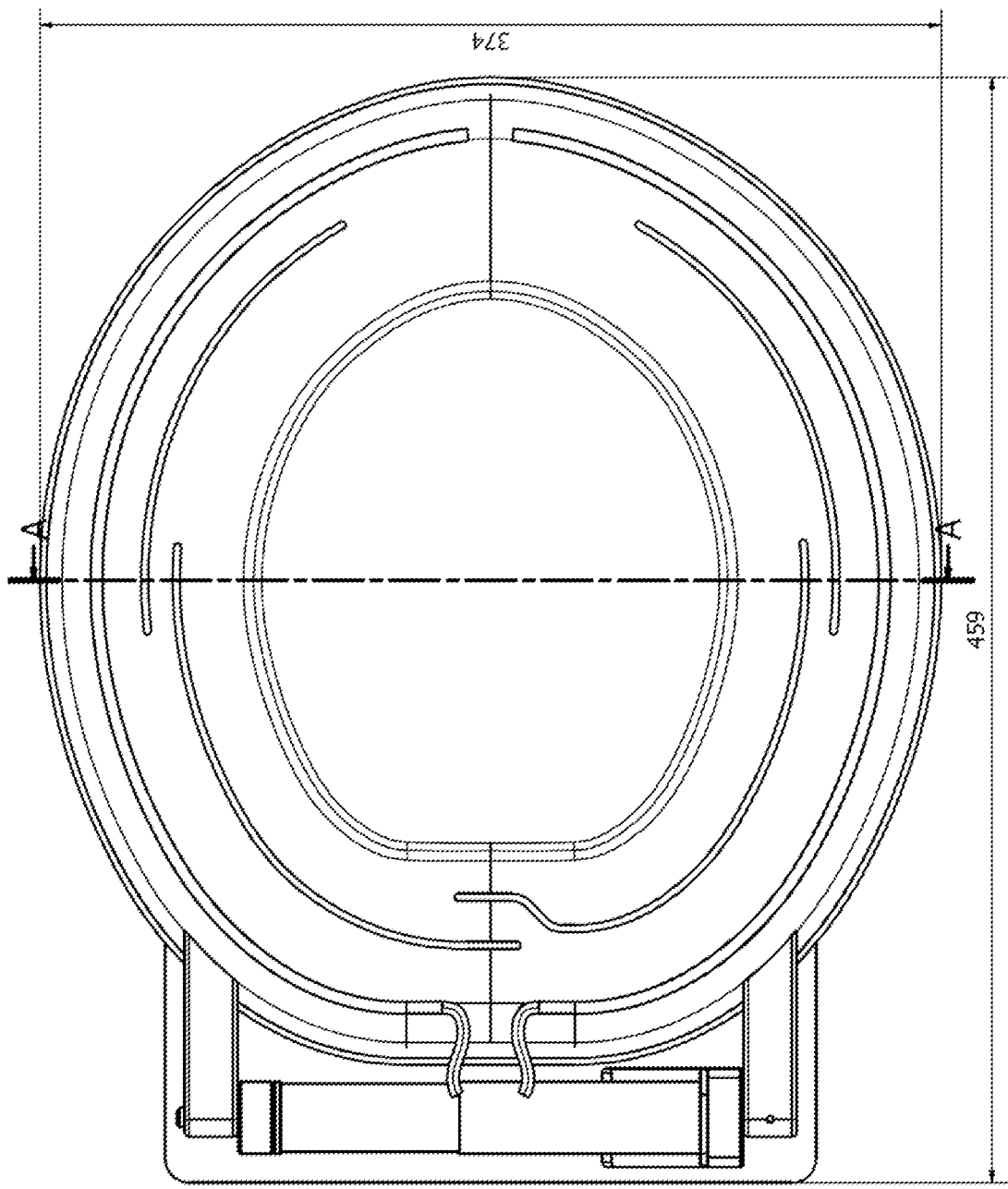
FIGS. 29-30 depict another embodiment of a toilet seat cover assembly in accordance with one embodiment of the present invention.
Figure 30:
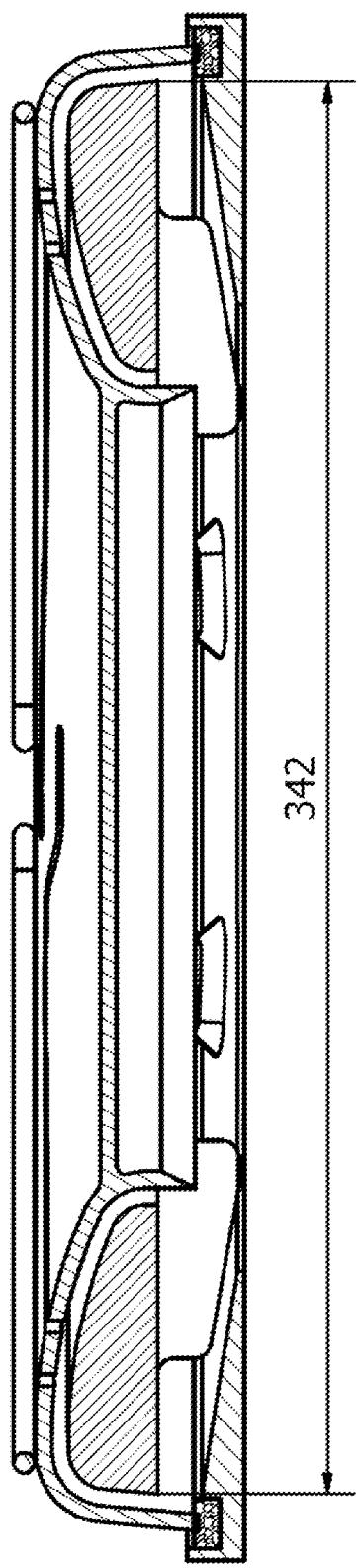

FIG. 11 shows a side cross sectional view of a toilet system including a toilet seat cover for automated cleaning of a toilet seat, in accordance with some embodiments. The views shown in FIGS. 11-13 are substantially similar to that shown in FIG. 9, and show alternative arrangements of various components within the toilet seat system. In FIG. 11, specifically, a fluid duct or channel 1100 is formed in the seat 200, rather than being attached to, or formed in, the seat cover 100, as in FIG. 6 and FIG. 9. The fluid channel 1100 can extend around the seat 200, just as is shown for the fluid channel 110 in FIG. 4, for example. At various points along the fluid channel 1100 there are passages to nozzles 1102 that provide a spray or mist/fog of disinfecting fluid that covers the surface of the seat 200, and other portions of the system exposed between the surface of the seat and the cover 100. In FIG. 12 an alternative arrangement locates a fluid channel (or tube) 1200 on the outside of seat cover 100, along the outer wall 102, which can be connected to several nozzles 1202 along the tube 1200. The tube 1200, as with fluid channel 110, extends around the seat 100 and is connected to several nozzles to provide a spray or mist/fog of disinfectant solution onto the surface of the seat 200.

FIG. 13 shows a side cross sectional view of a toilet system including a toilet seat cover for automated cleaning of a toilet seat, in accordance with some embodiments. In this arrangement, a heat element 1300 is included in the seat 200. The heat element 1300 can be a resistive heat element that is electrically powered and generate a low level of heat to both provide a level of comfort, and the assist in ensuring that fluid is removed from the surface of the seat. When the toilet is flushed, the air drawn over the seat 200 may not always remove all of the fluid, especially if the seat 200 is cool/cold. Warming the seat 200 to a comfortable temperature for sitting helps to cause evaporation of the fluid. This is especially useful when the fluid contains volatile constituents such as alcohol. Alternatively or in addition, the fluid itself can be heated/warmed prior to being dispensed through the nozzles onto the seat 200.

An automated toilet seat cleaning system has been disclosed that uses a seat cover to both spray a sanitizing fluid onto the seat, and then direct air over the surface of the seat to dry the seat surface. The seat cover is moveable, such as by a hinge at the back of the seat cover, between an open or lifted or raised position, and a closed or lowered position. The user first lifts the seat cover the lifted position before using the toilet. After using the toilet, the user lowers the seat cover to cover the toilet seat. The seat cover includes a fluid channel around the inside of the seat cover, which distribute a fluid such as a sanitizing fluid to a plurality of nozzles, causing a fluid spray to be distributed over the surface of the seat under the seat cover. Upon flushing the toilet, air is drawn through openings in the seat cover that cause air to flow over the surface of the sprayed seat to substantially dry the seat. The disclosed seat cover provides the benefit of sanitizing and cleaning a toilet seat without the need for moving parts such as a seat wiper, paper handling or other prior art devices that use various motors and components to clean a toilet seat. The disclosed toilet seat is nearly passive in operation, acting as a conduit for the sanitizing fluid, and providing structure for guiding air over the surface of the seat upon the toilet being flushed and creating an air pressure differential.

It should be understood that terms such as, "front," "rear," "side," top," "bottom," and the like are indicated from the reference point of a viewer viewing the cover and its assembly as depicted primarily in the figures. As used herein, the term "wall" is intended broadly to encompass continuous structures, as well as, separate structures that are coupled together so as to form a substantially continuous external surface.

With reference to FIGS. 14-18, additional embodiments of a toilet seat cover 1400 for automatic cleaning of a toilet seat is depicted and includes many of the same features and functionality as the toilet seat cover 100 depicted in FIGS. 1-9 and FIGS. 11-13, including but not limited to its connection with a toilet bowl assembly 300 with a fluid actuator 302, a pump 306, and other features and components described herein and apparent from the figures.

More specifically, it can be seen in FIGS. 14-18 that the toilet seat cover assembly 1400, 1500 for automatic cleaning of a toilet seat includes a toilet seat cover 1402, 1502. As seen in FIG. 25-28, other embodiments of the toilet seat cover assembly 2500, 2700 are depicted with a toilet seat cover 2502, 2702 that defines apertures (e.g., apertures 2504a-n) configured differently than the plurality of apertures 1404a-n depicted in FIGS. 14-18, wherein "n" represents any number greater than one. The apertures 1404a-n, 2504a-n may each be a diameter or width of approximately 4.5-5.5 mm and have a collective total area substantially equaling (+/−10%) the total area of the evacuation tube or channel 1814 defined by the basin bowl 1816, thereby maintaining a relatively stable pressure differential during the flushing process to generate the flow of the fluid (collectively illustrated with arrows 1818) over and around the toilet seat (e.g., toilet seats 1406, 1506, which depict a completely round or annular toilet seat and an annular toilet seat with a gap defined on the ends thereof, respectively).

The toilet seat cover, e.g., cover 1400, includes a top wall 1800 having a perimeter, defining a plurality of openings 1404a-n formed completely through the top wall 1800, and configured to cover a toilet seat 200 (exemplified in FIG. 18). The cover 1400 also includes an outer wall 1802 depending from the perimeter of the top wall 1800 and having a bottom edge 1808 and with an inner wall 1806 depending from the top wall 1800 and having a bottom edge 1810. Each of these bottom edges 1808, 1810 may include a polymeric material defined thereon or coupled thereto (e.g., seals or sealing members 1408, 1508) to provide or enable an airtight seal with a base member 1410, 1510 or the upper rim of the toilet defining access to the basin 1816. Said another way, the base member (e.g., base member 1410) may be utilized with the assembly 1400 and may define a sealing channel 1820 surrounding a surface in which the toilet seat 1406 is operably configured to be supported and mounted on, wherein the sealing channel 1820 having the sealing member 1408 disposed therein.

Further, the toilet seat cover 1400 also includes outer and inner walls 1802, 1806 configured to surround the toilet seat and defines, with the top wall 1800, the outer wall 1802, and the inner wall 1806, a seat channel 1804 sized to receive the toilet seat 200 with outer wall 1802 spaced apart from an outer side of the toilet seat and the inner wall 1806 spaced apart from the inner side of the toilet seat. The outer side of the toilet seat can be seen opposing the inner side of the toilet seat and the toilet seat defines a central opening therethrough. In one embodiment, there is just a space between the inner side of the toilet seat and the inner wall 1806.

In one embodiment, the assembly 1400 includes the base member 1410 having a surface in which the toilet seat 1406 is operably configured to be supported and mounted on, wherein the toilet seat cover has a lowered position with the bottom edge of the outer wall directly and physically coupled to the base member and the bottom edge of the inner wall physically uncoupled to the base member and defining a gap (e.g., gap 1822) that may continuously or discontinuously span around the toilet seat 1406 and between the base member 1410 and bottom edge 1810 of the inner wall 1806.

As discussed above, the assembly 1400 may also include a fluid channel 1812 disposed in proximity to the seat channel 1804 and has a plurality of nozzles (e.g., nozzle 2400) configured to spray over a top surface of the toilet seat 1406.

With reference to FIG. 3 and FIG. 18, the present invention is beneficially coupled to a vacuum-based toilet (e.g., toilet assembly 300) that includes a toilet bowl defining a bowl basin 1816 and a lower bowl aperture 1814 and has a toilet seat 1406 rotatably coupled to the toilet bowl. The toilet seat 1406 defines a center seat aperture and includes a front end (that may be completely round or define a gap thereon), an inner side of the toilet seat defining the center seat aperture, an outer side of the toilet seat, a rear end of the toilet seat, a top surface of the toilet seat, a valve operably configured to place the toilet 300 in a flushing position generating an induced vacuum through the lower bowl aperture 1814 and in the bowl basin. In some embodiments, the toilet may include a vacuum pump which is used when there is not sufficient differential pressure caused, for example, by the opening of an exhaust valve (e.g., valve 1824) that is disposed in or otherwise fluidly coupled to the lower bowl aperture, tube, or channel 1814. Once the valve 1824 in the toilet bowl is opened, the pressure difference (generated from the altitude from when the aircraft is in flight) causes air from the toilet bowl to be sucked rapidly out, causing air to flow from outside of the cover 1402 through the openings 1404a-n, into the seat channel 1804 to push the dispensed or emitted fluid, liquid, and/or vapor around and over the toilet seat 1406 (i.e., cleaning or sanitizing the seat). This cleaning process may be programmed to run for approximately 10 seconds.

In one embodiment, when the user is finished using the bathroom, the user will waive his or her hand over a sensor, which may then activate a motor (communicatively couped thereto) to lower or rotate the cover 1402 in the lowered position (exemplified in FIG. 18) covering the toilet seat 1406 and, in some embodiments, locking or resisting movement of the cover 1402 while the cleaning cycle is initiated and running. During the cleaning cycle, the sanitizing or cleaning fluid, liquid, vapor, etc. is emitted toward and/or on the top surface of the toilet seat 1406 and the fluid, liquid, vapor, etc. is transported over and around the toilet seat 1406 and evacuated along with the user waste. In most aircrafts, this waste flows through pipes to the rear of the aircraft where it is stored in tanks and emptied once on the ground, either by tanker or pumped into an underground storage system. After the cleaning cycle is finished, the cover 1402 is the rotated (preferably automatically by the motor) to a lifted position where a user can have access to and utilize the toilet seat 1406 as conventionally known.

Although the specification may describe and the figures may show a specific order of executing the process steps, the order of executing the steps may be changed relative to the order shown in certain embodiments. Also, two or more steps described or shown as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:
1. A toilet seat cover assembly for automatic cleaning of a toilet seat comprising:
    a toilet set cover:
        with a top wall having a perimeter, defining a plurality of openings formed completely through the top wall, and configured to cover a toilet seat;
        with an outer wall depending from the perimeter of the top wall and having a bottom edge and with an inner wall depending from the top wall and having a bottom edge, the outer and inner walls configured to surround the toilet seat; and
        defining, with the top wall, the outer wall, and the inner wall a seat channel sized to receive the toilet seat with outer wall spaced apart from an outer side of the toilet seat and the inner wall spaced apart from the inner side of the toilet seat, wherein the outer side of the toilet seat opposes the inner side of the toilet seat and the toilet seat defines a central opening therethrough; and
    a fluid channel disposed in proximity to the seat channel and having a plurality of nozzles configured to spray over a top surface of the toilet seat.

2. The toilet seat cover assembly of claim 1, further comprising:
a hinge member configured to allow movement of the toilet seat cover about a hinge between lifted position and a lowered position, wherein in the lowered position the toilet seat cover is over and covers the toilet seat, and in the lifted position the toilet seat cover is raised to allow use of the toilet seat by a user.

3. The toilet seat cover assembly of claim 2, further comprising:
a base member having a surface in which the toilet seat is operably configured to be supported and mounted on, wherein the toilet seat cover has the bottom edge of the outer wall directly and physically coupled to the base member when in the lowered position and the bottom edge of the inner wall physically uncoupled to the base member when in the lowered position and defining a gap between the base member and bottom edge of the inner wall when in the lowered position.

4. The toilet seat cover assembly of claim 1, further comprising:
a sealing member disposed at the bottom edge of the outer wall that is configured to create a substantially airtight seal around the bottom edge of the outer wall.

5. The toilet seat cover assembly of claim 4, further comprising:
a base member defining a sealing channel surrounding a surface in which the toilet seat is operably configured to be supported and mounted on, the sealing channel having the sealing member disposed therein.

6. The toilet seat cover assembly of claim 1, wherein the plurality of openings are distributed in a pattern that follows the seat channel around the toilet seat cover.

7. The toilet seat cover assembly of claim 1, wherein the fluid channel is formed inside the toilet seat cover at a corner between the outer wall and the top wall of the toilet seat cover.

8. The toilet seat cover assembly of claim 1, wherein the fluid channel is formed by a tube disposed in a corner at an inner surface of the outer wall and the top wall of the seat channel.

9. The toilet seat cover assembly of claim 1, further comprising:
a base member having a surface in which the toilet seat is operably configured to be supported and mounted on, the toilet seat cover having a lowered position with the bottom edge of the outer wall directly and physically coupled to the base member and the bottom edge of the inner wall physically uncoupled to the base member and defining a gap between the base member and bottom edge of the inner wall.

10. In combination with a vacuum-based toilet having a toilet bowl defining a bowl basin and a lower bowl aperture and having a toilet seat rotatably coupled to the toilet bowl, the toilet seat defining a center seat aperture and including a front end, an inner side of the toilet seat defining the center seat aperture, an outer side of the toilet seat, a rear end of the toilet seat, a top surface, a valve operably configured to place the toilet in a flushing position generating an induced vacuum through the lower bowl aperture and in the bowl basin, the improvement comprising;
a toilet seat cover assembly for automatic cleaning of the toilet seat and having:
a toilet set cover rotatably coupled to the toilet and:
with a top wall having a perimeter, defining a plurality of openings formed completely through the top wall, and configured to cover the toilet seat;
with an outer wall depending from the perimeter of the top wall and having a bottom edge and with an inner wall depending from the top wall and having a bottom edge, the outer and inner walls configured to surround the toilet seat; and
defining, with the top wall, the outer wall, and the inner wall a seat channel sized to receive the toilet seat with outer wall spaced apart from the outer side of the toilet seat and the inner wall spaced apart from the inner side of the toilet seat, wherein the outer side of the toilet seat opposes the inner side of the toilet seat and the toilet seat defines a central opening therethrough; and
a fluid channel disposed in proximity to the seat channel and having a plurality of nozzles configured to spray over the top surface of the toilet seat.

11. The improvement according to claim 10, wherein the plurality of openings defined by the toilet set cover collectively define a total area substantially equaling a total area of the lower bowl aperture defined by the basin bowl.

12. The improvement according to claim 10, further comprising:
a base member having a surface in which the toilet seat is operably configured to be supported and mounted on, wherein the toilet seat cover has the bottom edge of the outer wall directly and physically coupled to the base member when in a lowered position and the bottom edge of the inner wall physically uncoupled to the base member when in a lowered position and defining a gap between the base member and bottom edge of the inner wall when in the lowered position.

13. The improvement according to claim 10, further comprising:
a sealing member disposed at the bottom edge of the outer wall that is configured to create a substantially airtight seal around the bottom edge of the outer wall.

14. The improvement according to claim 13, further comprising:
a base member defining a sealing channel surrounding a surface in which the toilet seat is operably configured to be supported and mounted on, the sealing channel having the sealing member disposed therein.

15. The improvement according to claim 10, wherein the plurality of openings are distributed in a pattern that follows the seat channel around the toilet seat cover.

16. The improvement according to claim 15, wherein the plurality of openings are each less than approximately 6 mm in diameter and are disposed in a tightly and equally spaced configuration with respect to one another.

* * * * *